(12) United States Patent
Fukuba et al.

(10) Patent No.: US 7,520,365 B2
(45) Date of Patent: Apr. 21, 2009

(54) STEERING APPARATUS FOR VEHICLE

(75) Inventors: Hitoshi Fukuba, Hiroshima-ken (JP); Yoshihisa Okamoto, Hiroshima-ken (JP); Naoki Yamada, Hiroshima-ken (JP); Masaki Chiba, Hiroshima-ken (JP); Yusuke Kohge, Hiroshima-ken (JP); Hiroko Gendou, Hiroshima-ken (JP); Yusaku Takeda, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 76 days.

(21) Appl. No.: 11/714,745

(22) Filed: Mar. 7, 2007

(65) Prior Publication Data

US 2007/0219691 A1    Sep. 20, 2007

(30) Foreign Application Priority Data

| Mar. 15, 2006 | (JP) | ............................. | 2006-071557 |
| Mar. 15, 2006 | (JP) | ............................. | 2006-071558 |
| Mar. 15, 2006 | (JP) | ............................. | 2006-071559 |
| Mar. 15, 2006 | (JP) | ............................. | 2006-071560 |
| Mar. 15, 2006 | (JP) | ............................. | 2006-071563 |

(51) Int. Cl.
*B62D 6/00* (2006.01)
*A01B 69/00* (2006.01)

(52) U.S. Cl. .......................... 180/402; 180/446; 701/42

(58) Field of Classification Search ................. 180/446, 180/402, 272, 273; 701/42
See application file for complete search history.

(56) References Cited

U.S. PATENT DOCUMENTS

| 6,219,604 | B1 | 4/2001 | Dilger et al. | |
| 6,415,215 | B1* | 7/2002 | Nishizaki et al. | ............... 701/70 |
| 6,449,572 | B1 | 9/2002 | Kurz et al. | |
| 6,705,419 | B2* | 3/2004 | Menjak et al. | ............... 180/402 |
| 6,708,794 | B2* | 3/2004 | Menjak et al. | ............... 180/402 |
| 6,751,539 | B2* | 6/2004 | Uenuma et al. | ................ 701/41 |
| 6,795,763 | B2 | 9/2004 | Yao et al. | |
| 6,896,089 | B2* | 5/2005 | Mills et al. | ................... 180/402 |
| 6,901,320 | B2* | 5/2005 | Yao et al. | ....................... 701/44 |
| 6,918,460 | B2* | 7/2005 | Tajima et al. | ................ 180/402 |
| 6,938,720 | B2* | 9/2005 | Menjak et al. | ............... 180/402 |
| 6,973,989 | B2* | 12/2005 | Williams | ..................... 180/402 |
| 6,983,816 | B2* | 1/2006 | Takahashi et al. | ........... 180/402 |
| 7,004,278 | B2 | 2/2006 | Sugitani et al. | |
| 7,019,623 | B2 | 3/2006 | Klausner et al. | |

(Continued)

FOREIGN PATENT DOCUMENTS

DE    102 53 765    6/2004

(Continued)

OTHER PUBLICATIONS

European Search Report application EP 07 10 3090 dated Jun. 27, 2007.

*Primary Examiner*—Paul N Dickson
*Assistant Examiner*—Patrick Centolanzi
(74) *Attorney, Agent, or Firm*—Studebaker & Brackett PC; Donald R. Studebaker

(57) ABSTRACT

A steering apparatus for a vehicle, which can reduce the steering load and allows accurate steering angle control, is provided. In the steering apparatus for a vehicle, an estimation unit estimates a mechanical impedance upon a driver's steering manipulation. A control unit controls the steering reaction force of a steering wheel based on the estimated mechanical impedance.

13 Claims, 24 Drawing Sheets

U.S. PATENT DOCUMENTS

| | | |
|---|---|---|
| 7,092,805 B2 * | 8/2006 | Kasahara et al. ............... 701/41 |
| 7,127,341 B2 * | 10/2006 | Whang ........................ 701/43 |
| 7,191,864 B2 * | 3/2007 | Sugitani et al. ............. 180/402 |
| 7,418,326 B2 * | 8/2008 | Ogawa et al. ................ 701/41 |
| 7,448,464 B2 * | 11/2008 | Yamasaki et al. ........... 180/402 |
| 7,455,146 B2 * | 11/2008 | Brosig et al. ................ 180/272 |
| 7,467,809 B2 * | 12/2008 | Breed et al. ................. 280/735 |
| 2003/0189493 A1 | 10/2003 | Klausner et al. |
| 2004/0088093 A1 | 5/2004 | Yao et al. |

FOREIGN PATENT DOCUMENTS

| | | |
|---|---|---|
| EP | 1 433 691 A2 | 6/2004 |
| JP | 11-078947 | 3/1999 |
| JP | 2004-210024 | 7/2004 |

* cited by examiner

FIG. 4A

K : RIGIDITY COEFFICIENT (M/m)

GENDER : FEMALE    AGE : 26 TO 35
GENDER : FEMALE    AGE : 18 TO 25
GENDER : MALE    AGE : 26 TO 35
GENDER : MALE    AGE : 18 TO 25

| WEIGHT | HEIGHT | | | | |
|---|---|---|---|---|---|
| | 150 | 160 | 170 | 180 | 220 |
| 40 | 10.3 | 12.5 | 14.5 | 15.6 | ····· 24.5 |
| 50 | 15.6 | 18.9 | 20.5 | 24.5 | ····· 28.5 |
| 60 | 18.6 | 21.3 | 25.5 | 28.5 | ····· 33.5 |
| ⋮ | ⋮ | | | | |
| 150 | 27.5 | 31.8 | 35.5 | 40.3 | ····· 50.5 |

FIG. 4B

B : VISCOSITY COEFFICIENT (N·Sec/m)

GENDER : FEMALE    AGE : 26 TO 35
GENDER : FEMALE    AGE : 18 TO 25
GENDER : MALE    AGE : 26 TO 35
GENDER : MALE    AGE : 18 TO 25

| WEIGHT | HEIGHT | | | | |
|---|---|---|---|---|---|
| | 150 | 160 | 170 | 180 | 220 |
| 40 | 0.98 | 0.91 | 0.85 | 0.80 | ····· 0.52 |
| 50 | 0.93 | 0.88 | 0.81 | 0.76 | ····· 0.47 |
| 60 | 0.88 | 0.82 | 0.78 | 0.71 | ····· 0.42 |
| ⋮ | ⋮ | | | | |
| 150 | 0.42 | 0.35 | 0.29 | 0.24 | ····· 0.13 |

FIG. 4C

M : NERTIA COEFFICIENT (N·Sec$^2$/m)

GENDER : FEMALE    AGE : 26 TO 35
GENDER : FEMALE    AGE : 18 TO 25
GENDER : MALE    AGE : 26 TO 35
GENDER : MALE    AGE : 18 TO 25

| WEIGHT | HEIGHT | | | | |
|---|---|---|---|---|---|
| | 150 | 160 | 170 | 180 | 220 |
| 40 | 0.078 | 0.072 | 0.068 | 0.063 | ····· 0.042 |
| 50 | 0.070 | 0.063 | 0.060 | 0.055 | ····· 0.038 |
| 60 | 0.065 | 0.060 | 0.056 | 0.050 | ····· 0.032 |
| ⋮ | ⋮ | | | | |
| 150 | 0.042 | 0.031 | 0.025 | 0.020 | ····· 0.013 |

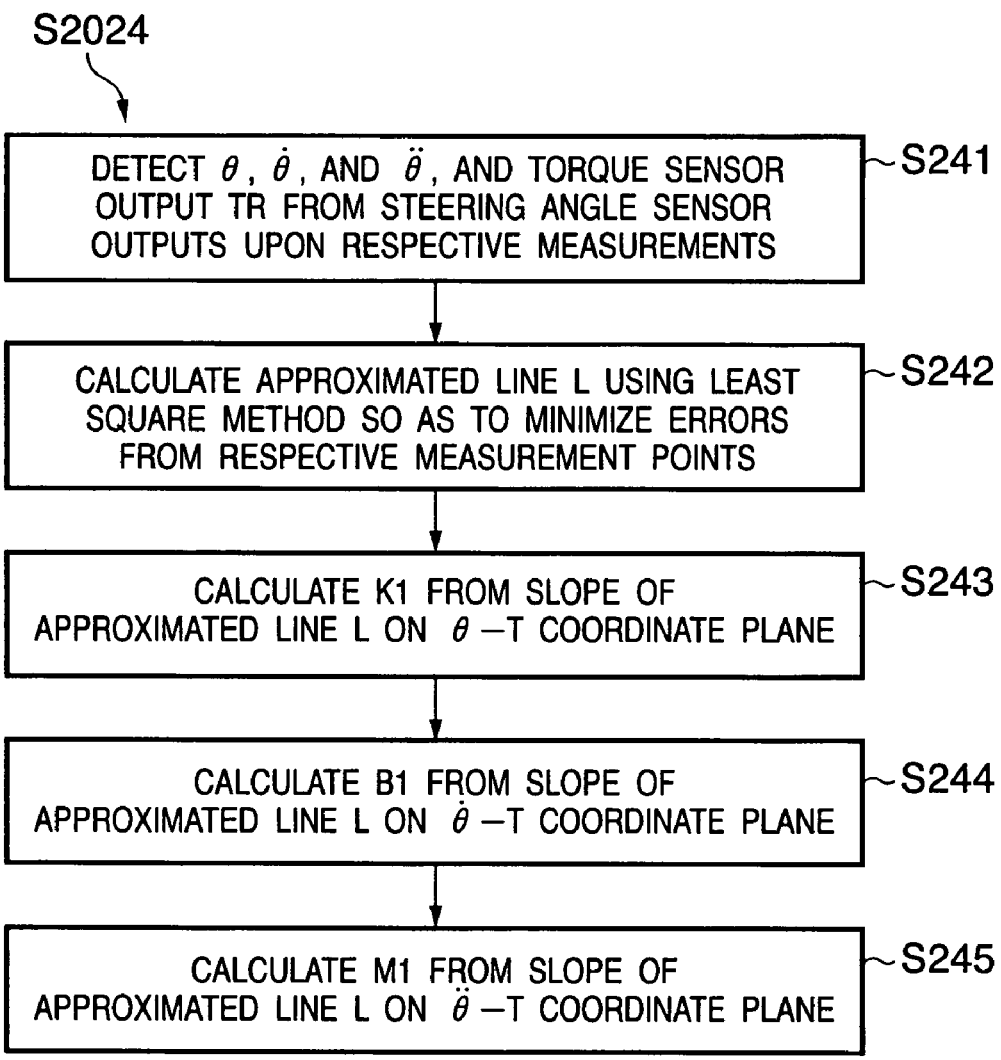

FIG. 17A1 RIGIDITY → VISCOSITY → INERTIA
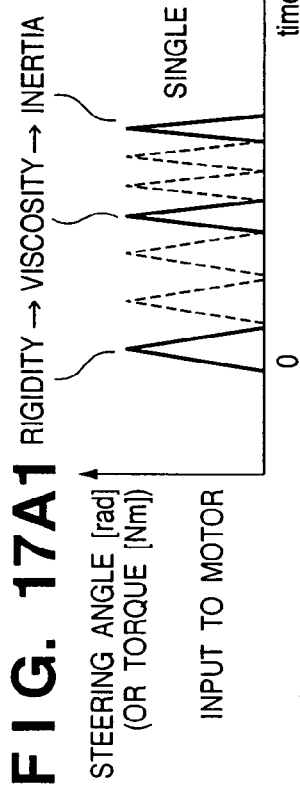
FIG. 17B1
FIG. 17C1
FIG. 17A2
FIG. 17B2
FIG. 17C2

STEERING APPARATUS FOR VEHICLE

BACKGROUND OF THE INVENTION

1. Field of the Invention

The present invention relates to a steering apparatus for a vehicle.

2. Description of the Related Art

Nowadays, most automobiles have power steering apparatuses. A power steering apparatus is very useful to reduce the required steering power.

On the other hand, the steering apparatus is required to obtain a feedback of an appropriate reaction force in steering. There have been proposed a variety of reaction force control mechanisms. For example, Japanese Patent Laid-Open No. 11-78947 discloses a mechanism for controlling a steering reaction force in accordance with the vehicle velocity and road surface condition. Japanese Patent Laid-Open No. 2004-210024 discloses a mechanism for controlling a steering reaction force based on the vehicle velocity and a deviation between the target value and actual value of a tire steering angle.

However, an appropriate steering reaction force must change depending on the driver. Japanese Patent Laid-Open No. 2004-210024 also describes that the steering reaction force can be adjusted in accordance with the driver's favor. However, at the present time, such adjustment cannot be done automatically.

SUMMARY OF THE INVENTION

It is, therefore, an object of the present invention to implement a steering reaction force control mechanism which can appropriately set a steering reaction force in accordance with each individual driver, thereby contributing to a reduction of the steering load or a more accurate steering angle control.

According to the present invention, the above object is achieved by providing a steering apparatus for a vehicle, comprising an estimation unit configured to estimate a mechanical impedance on a driver's steering manipulation, and a control unit configured to control a steering reaction force of a steering wheel based on the estimated mechanical impedance.

According to a preferred embodiment of the present invention, it is preferable that the apparatus further comprises a motor configured to turn the steering wheel, and a generation unit configured to generate a drive signal as a measurement signal required to drive the motor so as to forcibly turn the steering wheel a predetermined amount, wherein the estimation unit estimates the mechanical impedance of the driver based on an amount of steering manipulation which is applied in response to the turn of the steering wheel by driving the motor according to the measurement signal.

With this arrangement, the steering wheel is turned by a predetermined amount in response to a measurement signal generated by the generation unit. The driver behind the steering wheel must react to this turn. In many cases, the driver automatically applies a force on the steering wheel in the reverse direction of this turn of the steering wheel. Since a mechanical impedance is estimated based on the driver's reaction, an appropriate steering reaction force can be easily and precisely set.

According to a preferred embodiment of the present invention, it is preferable that the apparatus further comprises a torque sensor configured to detect a rotational torque on the steering wheel, and a steering angle sensor configured to detect a steering angle of the steering wheel, wherein the estimation unit estimates the mechanical impedance based on outputs from the torque sensor and the steering angle sensor.

With this arrangement, the amount of steering manipulation can be objectively and accurately measured by the torque sensor and steering angle sensor.

According to a preferred embodiment of the present invention, the measurement signal is preferably a pulse signal. With this arrangement, a turn of the steering wheel in response to an input of this pulse signal becomes an instantaneous one, and does not adversely affect normal driving.

Furthermore, according to a preferred embodiment of the present invention, it is preferable that the amplitude of the pulse signal is gradually increased. With this arrangement, at the time of detection of a steering manipulation as a driver's reaction while gradually increasing the amplitude of the pulse signal, generation of the pulse signal can be stopped, and the mechanical impedance can be efficiently measured.

According to another preferred embodiment of the present invention, it is preferable that the measurement signal is a signal corresponding to three-band frequencies which respectively correspond to an inertia term, a viscosity term, and a rigidity term that represent characteristics of the mechanical impedance.

With this arrangement, the inertia coefficient, viscosity coefficient, and rigidity coefficient as the characteristics of the mechanical impedance can be efficiently calculated.

According to a preferred embodiment of the present invention, it is preferable that the estimation unit applies an estimation method using a spectrum of an output signal from the torque sensor.

With this arrangement, the inertia coefficient, viscosity coefficient, and rigidity coefficient that appear in a spectral waveform can be efficiently estimated.

According to another preferred embodiment of the present invention, it is preferable that the measurement signal is a signal which simulates a road surface reaction force.

With this arrangement, since the forced turn of the steering wheel required to measure the mechanical impedance simulates the road surface reaction force, this turn does not make the driver feel uneasy.

According to a preferred embodiment of the present invention, it is preferable that the apparatus further comprises a travel state detection unit configured to detect a travel state of the vehicle, and a correction unit configured to correct the pulse signal in accordance with the travel state of the vehicle detected by the travel state detection unit.

With this arrangement, the strength of the forced turn of the steering wheel required to measure the mechanical impedance can be transmitted more adequately to the driver in accordance with the travel state within the range which does not make the driver feel uneasy and without any influence of a disturbance and the like.

According to a preferred embodiment of the present invention, it is preferable that the travel state includes a road surface $\mu$, a turn state, and a vehicle velocity.

With this arrangement, the strength of the forced turn of the steering wheel required to measure the mechanical impedance can be transmitted to the driver more adequately within the range which does not make the driver feel uneasy and without any influence of a disturbance and the like.

According to a preferred embodiment of the present invention, it is preferable that the apparatus further comprises a driver's state detection unit configured to detect a driver's state, and a correction unit configured to correct the pulse signal in accordance with the driver's state detected by the driver's state detection unit.

With this arrangement, the strength of the forced turn of the steering wheel required to measure the mechanical impedance can be transmitted to the driver in accordance with the driver's state within the range which does not make the driver feel uneasy and without any influence of a disturbance and the like.

According to a preferred embodiment of the present invention, it is preferable that the driver's state includes a state indicating whether the driver holds the steering wheel with a single hand or both hands, a tension level of the driver, and a seating posture.

With this arrangement, the strength of the forced turn of the steering wheel required to measure the mechanical impedance can be transmitted to the driver more adequately within the range which does not make the driver feel uneasy and without any influence of a disturbance and the like.

According to a preferred embodiment of the present invention, it is preferable that the driver's state further includes gripping positions and a gripping strength of the steering wheel.

With this arrangement, since the driver's state can be recognized more practically, the strength of the forced turn of the steering wheel required to measure the mechanical impedance can be transmitted to the driver more adequately within the range which does not make the driver feel uneasy and without any influence of a disturbance and the like.

According to a preferred embodiment of the present invention, it is preferable that the apparatus further comprises a physical construction estimation unit configured to estimate a driver's physical construction, and a correction unit configured to correct the pulse signal in accordance with the driver's physical construction estimated by the physical construction estimation unit.

With this arrangement as well, the strength of the forced turn of the steering wheel required to measure the mechanical impedance can be transmitted to the driver in accordance with the driver's state within the range which does not make the driver feel uneasy and without any influence of a disturbance and the like.

According to a preferred embodiment of the present invention, it is preferable that the apparatus further comprises a determination unit configured to determine whether or not the mechanical impedance can be stably estimated, and an estimation inhibition unit configured to, when the determination unit determines that the mechanical impedance cannot be stably estimated, inhibit the estimation unit from estimating the mechanical impedance.

With this arrangement, since the mechanical impedance is not estimated in an inappropriate situation, setting of an incorrect steering reaction force can be avoided.

According to a preferred embodiment of the present invention, it is preferable that the determination unit determines based on at least one of a tension level of the driver and a road surface μ whether or not the mechanical impedance can be stably estimated.

With this arrangement, estimation of the mechanical impedance can be inhibited at a more appropriate timing and by a simple arrangement.

According to a preferred embodiment of the present invention, it is preferable that the generation unit generates the measurement signal at one of the timings of an engine start-up timing, of during a steady turn, and of after an elapse of a predetermined period of time of continuous travel.

With this arrangement, the mechanical impedance can be estimated by selecting a timing that does not make the driver feel uneasy.

According to a preferred embodiment of the present invention, it is preferable that the generation unit does not generate the measurement signal when the driver does not grip the steering wheel at the engine start-up timing.

The mechanical impedance cannot be estimated unless the driver grips the steering wheel. In view of this, since the driver is unlikely to grip the steering wheel at the engine start timing, such case can be excluded from the estimation timing of the mechanical impedance according to the above arrangement.

Furthermore, according to a preferred embodiment of the present invention, it is preferable that when the vehicle is a vehicle which uses an electric motor as a drive source in addition to an engine, the generation unit generates the measurement signal at one of timings of a start-up timing of the electric motor, and of during a steady turn and after an elapse of a predetermined period of time of continuous travel.

With this arrangement, even when the vehicle is a hybrid vehicle, the mechanical impedance can be estimated by selecting a timing that does not make the driver feel uneasy.

According to a preferred embodiment of the present invention, it is preferable that the apparatus further comprises a detection unit configured to detect the amount of steering manipulation of the steering wheel which is done at a predetermined timing, wherein the estimation unit estimates the mechanical impedance of the driver based on the manipulation amount detected by the detection unit.

With this arrangement, since the mechanical impedance is estimated based on the amount of steering manipulation at a predetermined timing, an appropriate steering reaction force can be easily and precisely set.

According to a preferred embodiment of the present invention, it is preferable that the apparatus further comprises a torque sensor configured to detect a rotational torque on the steering wheel, and a steering angle sensor configured to detect a steering angle of the steering wheel, wherein the estimation unit estimates the mechanical impedance based on outputs from the torque sensor and the steering angle sensor.

With this arrangement, the amount of steering manipulation can be objectively and accurately measured by the torque sensor and steering angle sensor.

According to a preferred embodiment of the present invention, it is preferable that the apparatus further comprises a road surface drop detection unit configured to detect a road surface drop, and the predetermined timing falls within a predetermined period after the road surface drop detection unit detects the road surface drop.

With this arrangement, a kick back upon passage of the vehicle over the road surface drop can be used as a trigger for making the driver perform a steering manipulation. Therefore, in this case, the need for the processing for forcibly turning the steering wheel as a trigger for making the driver perform a steering manipulation or the like can be obviated. As a result, the amount of steering manipulation can be measured by a simple arrangement.

According to a preferred embodiment of the present invention, it is preferable that the predetermined timing is a timing when an output from the torque sensor changes to be larger than a predetermined value within a predetermined period of time or when an output from the steering angle sensor changes to be larger than a predetermined value within a predetermined period of time.

With this arrangement, the influence of a disturbance on the amount of steering can be reduced (that is, the S/N improves). Therefore, the mechanical impedance can be estimated with high precision.

According to a preferred embodiment of the present invention, it is preferable that the detection unit superposes a characteristic signal required to measure the mechanical impedance on steering characteristics, and detects the amount of steering manipulation in response to the turn of the steering wheel based on the steering characteristics superposed with the characteristic signal.

With this arrangement, the superposed characteristic signal itself serves as a trigger for making the driver perform a steering manipulation. Therefore, the amount of steering manipulation can be measured with certainty.

According to a preferred embodiment of the present invention, it is preferable that the apparatus further comprises a storage unit configured to store a lookup table which describes a relationship between physical constructions of drivers and mechanical impedances of the drivers associated with steering manipulations, and a detection unit configured to detect a physical construction of the driver, wherein the estimation unit estimates the mechanical impedance corresponding to the physical construction detected by the detection unit using the lookup table stored in the storage unit.

With this arrangement, since the mechanical impedance of the driver is estimated based on the physical construction of that driver, an appropriate steering reaction force can be easily and precisely set.

According to a preferred embodiment of the present invention, it is preferable that the detection unit detects the physical construction based on one of a telescopic position, a steer position, and a seat slide position. Alternatively, the detection unit may read information of a physical construction of a driver from a detachable storage medium in which the information of the physical construction of the driver is stored. Alternatively, the detection unit may detect the physical construction based on an image of the driver detected by an image sensor arranged to face the driver.

With this arrangement, the physical construction of the driver can be obtained more precisely and easily.

According to a preferred embodiment of the present invention, it is preferable that the lookup table includes an inertia coefficient, a viscosity coefficient, and a rigidity coefficient as characteristic parameters of the mechanical impedance for each physical construction of a driver, and the estimation unit includes a unit configured to calculate a steering torque to be applied by the driver using the inertia coefficient, the viscosity coefficient, and the rigidity coefficient corresponding to the physical construction detected by the detection unit.

With this arrangement, the mechanical impedance of the driver can be estimated reasonably.

According to a preferred embodiment of the present invention, it is preferable that the estimation unit estimates the mechanical impedance of the driver based on one of the amount of steering manipulation, which appears as a reaction of the driver when the steering wheel is forcibly turned by a predetermined amount, and the amount of steering manipulation, which is made at a predetermined timing, the apparatus further comprises a disturbance removal unit configured to remove a disturbance, which is included in the mechanical impedance estimated by the estimation unit and is received from the vehicle, and the control unit controls the steering reaction force of the steering wheel based on the mechanical impedance from which the disturbance is removed by the disturbance removal unit.

With this arrangement, since the mechanical impedance which is free from the influence of a disturbance on the vehicle can be estimated, an appropriate steering reaction force can be precisely set.

According to a preferred embodiment of the present invention, it is preferable that the disturbance removal unit includes a disturbance measurement signal generation unit configured to generate a disturbance measurement signal required to drive the motor so as to forcibly turn the steering wheel while the driver does not grip the steering wheel, a disturbance estimation unit configured to estimate the disturbance based on a steering behavior while the driver does not grip the steering wheel upon turning of the steering wheel driven by the motor in accordance with the disturbance measurement signal, and a subtraction unit configured to subtract the disturbance estimated by the disturbance estimation unit from the mechanical impedance estimated by the estimation unit.

With this arrangement, the influence of the disturbance can be efficiently and precisely removed.

According to a preferred embodiment of the present invention, it is preferable that an operation of the disturbance removal unit is inhibited when the vehicle is not at a stop or when the driver does not grip the steering wheel.

With this arrangement, a case wherein the influence of the disturbance cannot be extracted with high precision can be excluded from the disturbance removal processing.

According to a preferred embodiment of the present invention, it is preferable that an impedance of the disturbance is set to be a pre-stored predetermined value when a high-speed straight travel is in progress or when a steady turn within a constant angle range is in progress.

With this arrangement, when the disturbance does not change largely, the disturbance can be handled as a fixed value without the intervention of any actual measurement.

According to a preferred embodiment of the present invention, it is preferable that the subtraction unit subtracts an average value of a plurality of disturbances estimated by the disturbance estimation unit from the mechanical impedance estimated by the estimation unit.

With this arrangement, an impedance of a steady disturbance can be calculated.

According to a preferred embodiment of the present invention, it is preferable that the subtraction unit excludes the disturbance from an object to be subtracted when a value indicating the disturbance estimated by the disturbance estimation unit falls outside a predetermined range.

With this arrangement, the calculation result of the disturbance that pertains to a detection error is excluded from an object to be subtracted, thus improving the disturbance removal performance.

According to a preferred embodiment of the present invention, it is preferable that the estimation unit estimates the mechanical impedance of the driver based on one of the amount of steering manipulation, which appears as a reaction of the driver when the steering wheel is forcibly turned by a predetermined amount, and the amount of steering manipulation, which is made at a predetermined timing, and the apparatus further comprises a setting unit configured to set a steering reaction force of the steering wheel based on the mechanical impedance estimated by the estimation unit, and a change unit configured to change the steering reaction force set by the setting unit based on a drive state of the vehicle.

With this arrangement, a steering reaction force is appropriately set based on the driving state of the vehicle for each driver.

According to a preferred embodiment of the present invention, it is preferable that the change unit increases the amount of change in steering reaction force at the beginning of travel, and decreases the amount of change during travel.

With this arrangement, a steering reaction force at the beginning of travel can be set more appropriately.

According to a preferred embodiment of the present invention, it is preferable that the apparatus further comprises an unit configure to checking if a driver is the same driver as in a previous processing, wherein the change unit decreases the amount of change in the steering reaction force when the driver is the same driver as in the previous processing.

With this arrangement, the driver can obtain a similar steering reaction force whenever he or she gets into the vehicle.

According to a preferred embodiment of the present invention, it is preferable that the change unit gradually changes the steering reaction force during travel.

With this arrangement, the driver never experiences any unnatural steering feeling by an abrupt change in steering reaction force during travel.

According to a preferred embodiment of the present invention, it is preferable that the change unit changes the steering reaction force during straight travel.

With this arrangement, the driver never experiences any unnatural steering feeling from a change in steering reaction force during turning.

Further features of the present invention will become apparent from the following description of exemplary embodiments with reference to the attached drawings.

BRIEF DESCRIPTION OF THE DRAWINGS

FIGS. 4A to 4C show examples of the data structure of a human impedance calculation LUT according to the first embodiment;

FIG. 11 is a flowchart showing an example of the calculation sequence of a rigidity coefficient, viscosity coefficient, and inertia coefficient according to the second embodiment;

FIGS. 17A1 to 17C2 are graphs showing examples of a measurement signal, steering angle sensor, and steering torque sensor according to the fifth embodiment;

DESCRIPTION OF THE EMBODIMENTS

Preferred embodiments of the present invention will be described in detail in accordance with the accompanying drawings. The present invention is not limited by the disclosure of the embodiments and all combinations of the features described in the embodiments are not always indispensable to solving unit of the present invention.

First Embodiment

Figure 1:
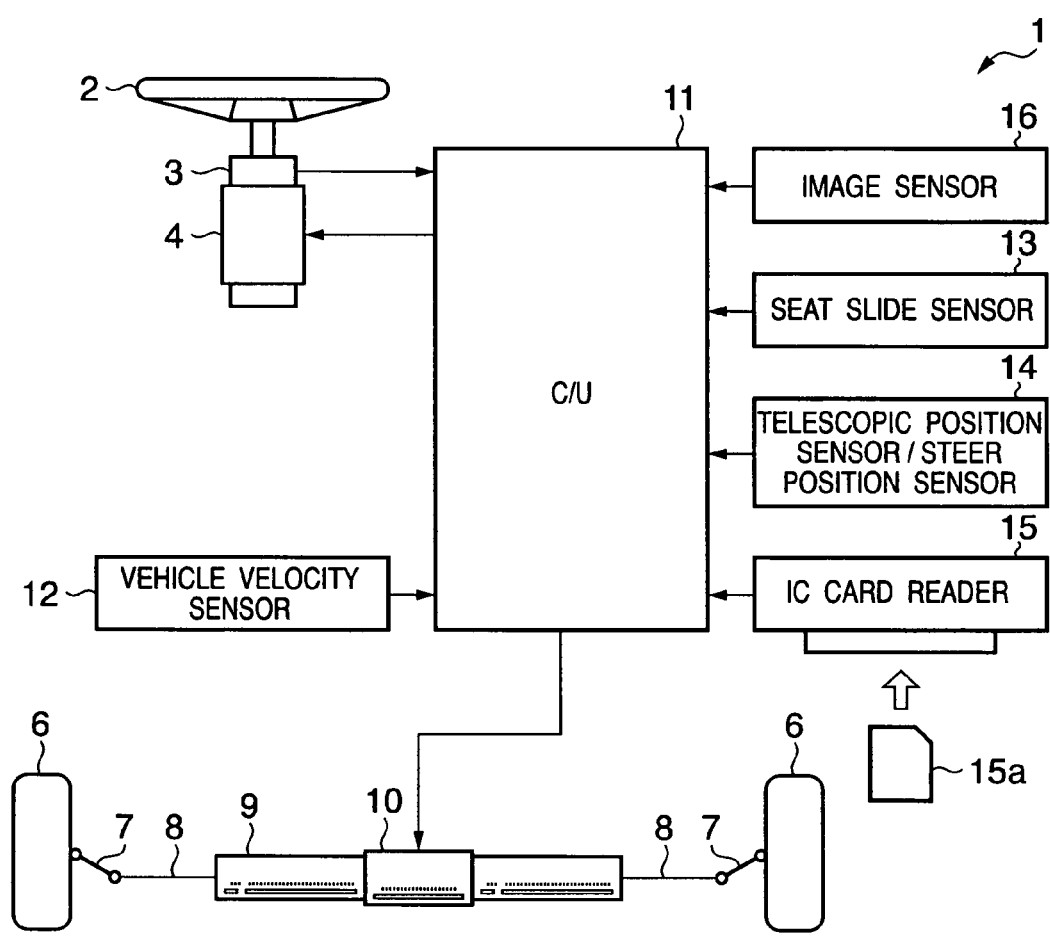
FIG. 1 is a schematic diagram showing the arrangement of a steering apparatus according to the first embodiment.

FIG. 1 is a schematic diagram showing the arrangement of a steering apparatus 1 according to this embodiment.

Referring to FIG. 1, reference numeral 2 denotes a steering wheel. To this steering wheel 2, a steering angle sensor 3 for detecting the steering angle of the steering wheel 2, and a steering reaction force generation motor 4 are attached.

A pair of right and left tires 6 are coupled via knuckle arms 7, tie rods 8, and a steering rod 9, and a steering motor 10 for driving the steering rod 9 in the axial direction to give a steering angle to the tires 6 is provided at the center of the steering rod 9.

The steering apparatus 1 shown in FIG. 1 is of a so-called steer-by-wire type. That is, the steering rod 9 is not mechanically connected to the steering wheel 2 via a steering shaft or the like but is electrically connected to it. A control unit (C/U) 11 executes steering control of the steering wheel 2 via such electrical connection. A detection value (corresponding to the amount of manipulation that the driver applies to the steering wheel 2) of the steering angle sensor 3 is input to the control unit 11, which outputs a control value to the steering motor 10. The control unit 11 basically calculates the target angle of the steering angle of the tires 6 based on the detection value of the steering angle sensor 3, and feedback-controls the steering motor 10 based on the calculated target value, thus controlling the tire steering angle.

The steering apparatus 1 further comprises the following components. Reference numeral 12 denotes a vehicle velocity sensor which detects a vehicle velocity; and 13, a seat slide sensor which detects the seat slide position of a driver's seat (not shown). The steering apparatus 1 has a telescopic mechanism (not shown), which allows for adjustment of the position of the steering wheel 2 in the front-rear direction of the vehicle, and comprises a telescopic position sensor or steer position sensor 14 which detects the telescopic position, accordingly. Reference numeral 15 denotes an IC card reader which reads driver's information (details will be described later) from an IC card 15a. Reference numeral 16 denotes an image sensor (comprising, e.g., a CCD camera) which acquires image information of the driver.

Figure 2:
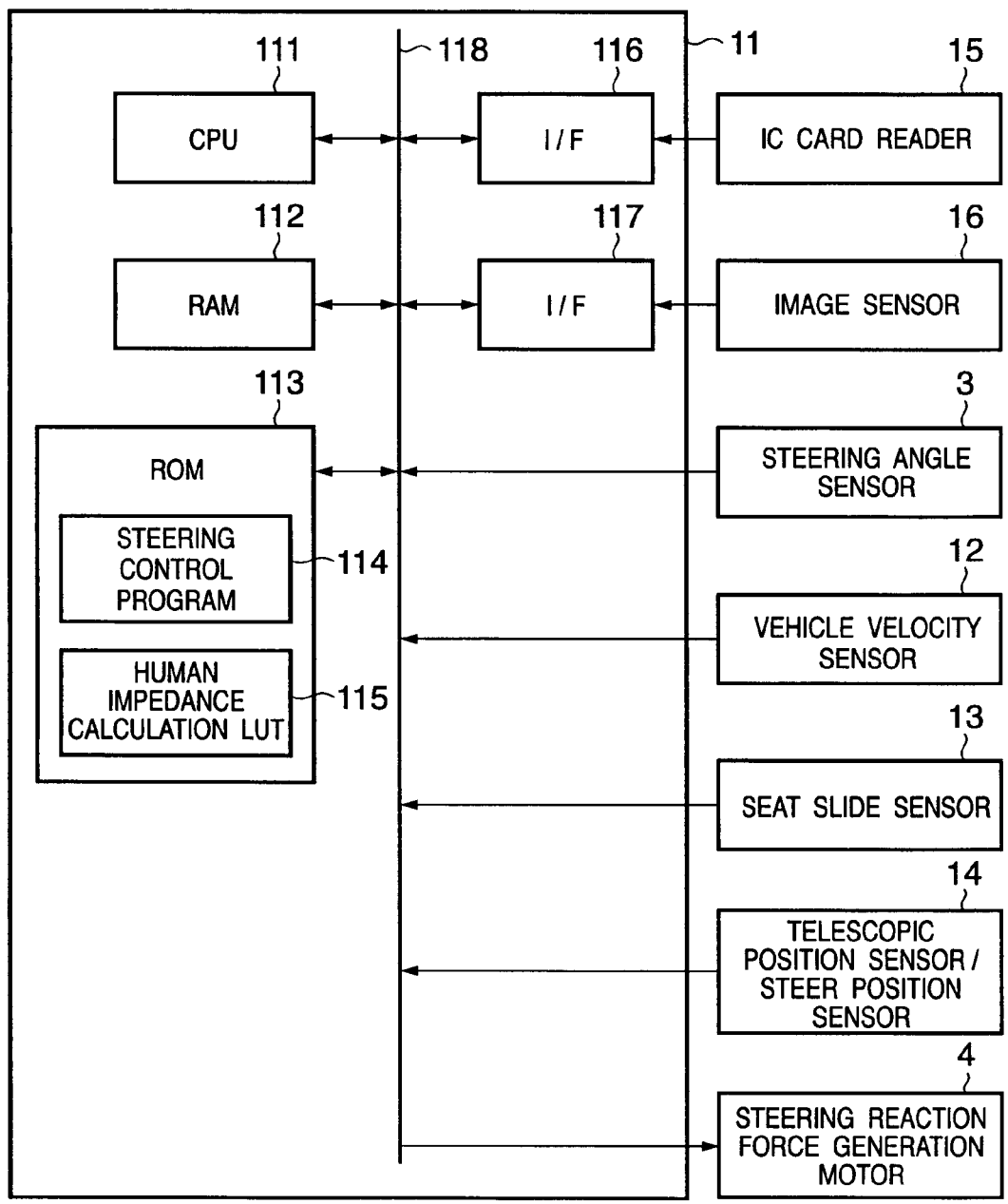
FIG. 2 is a block diagram showing the arrangement of a control unit according to the first embodiment.

FIG. 2 is a block diagram showing the arrangement of the control unit 11.

As shown in FIG. 2, the control unit 11 comprises a CPU 111 which systematically controls the apparatus of this embodiment, a RAM 112 which provides a work area of the CPU 111, and a ROM 113 which stores permanent programs and data, and also an interface (I/F) 116 which connects the IC card reader 15, and an interface 117 which connects the image sensor 16. More specifically, the ROM 113 stores a steering control program 114 which implements the aforementioned basic steering control and steering reaction force control (to be described later), and a human impedance calculation lookup table (LUT) 115 which is looked up in the steering reaction force control (to be described later). The CPU 111, RAM 112, ROM 113, and interfaces 116 and 117 are connected to a bus 118. The steering angle sensor 3, vehicle velocity sensor 12, seat slide sensor 13, and telescopic position sensor or steer position sensor 14 are connected to the bus 118, e.g., directly. The IC card reader 15 and image sensor 16 are connected to the bus 118 via the interfaces 116 and 117.

The arrangement of the steering apparatus 1 of this embodiment has been roughly explained.

The steering reaction force control of this embodiment will be described below.

The driver who holds the steering wheel 2 can be considered as a resistance against the turn of the steering wheel 2 when viewed from the steering wheel 2. In this specification, this resistance is called a "human impedance" or "mechanical impedance" of the driver. The human impedance is a value specified by the steering force applied by the driver. Since the steering force changes depending on drivers, the human impedance also changes depending on drivers. Therefore, by calculating this human impedance, a steering reaction force depending on the driver can be set. As will be described below, this embodiment estimates the human impedance based on the gender difference, age, physical construction, and the like of the driver.

A steering torque (to be referred to as a "human impedance torque" hereinafter) T which is calculated based on the human impedance of the driver and is to be applied to the steering wheel 2, can be described by:

$$T(t)=K\cdot\theta(t)+B\cdot\dot\theta(t)+M\cdot\ddot\theta(t) \quad (1)$$

where $\theta$, $\dot\theta$, and $\ddot\theta$ are respectively the steering angle, steering angle change rate, and steering angle change acceleration of the steering wheel 2. Also, K, B, and M represent characteristic parameters of the human impedance, i.e., a rigidity coefficient, viscosity coefficient, and inertia coefficient, respectively.

Figure 3:
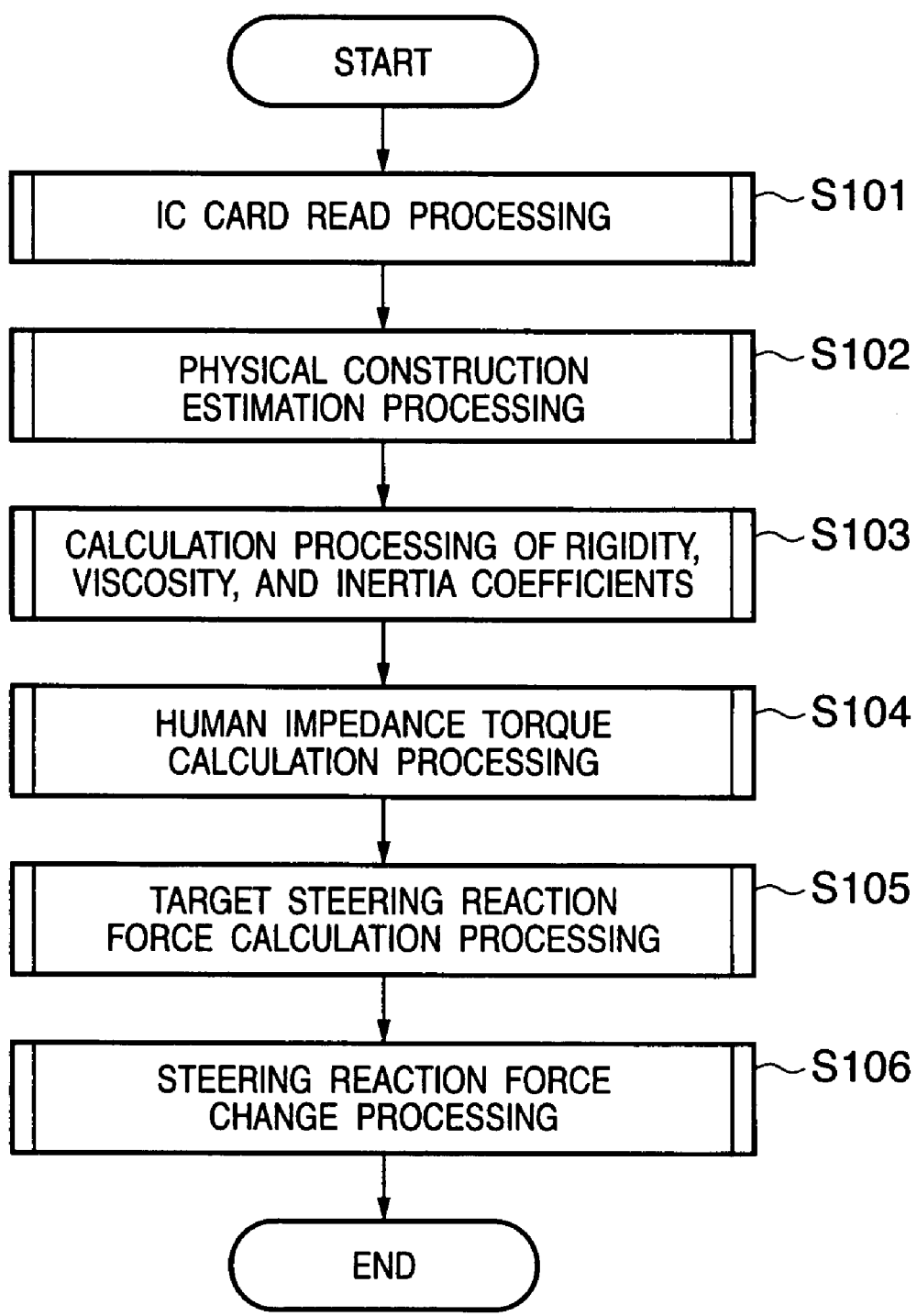
FIG. 3 is a flowchart showing steering reaction force control processing according to the first embodiment.

FIG. 3 is a flowchart showing the steering reaction force control processing of this embodiment. The steering control program 114 stored in the ROM 113 includes a program corresponding to this flowchart, and the CPU 111 executes this program.

In step S101, the CPU 111 loads driver's information written in the IC card 15a via the IC card reader 15. Note that the required driver's information includes, e.g., the gender, age, weight, and height of the driver.

In step S102, the CPU 111 estimates the physical construction of the driver based on the loaded information. If the CPU 111 can successfully load the gender, age, weight, and height data of the driver in step S101, the loaded values can be used as estimated values intact.

However, the IC card 15a may not store such information, and loading of these data may fail. In such case, the physical construction of the driver may be estimated based on the seat slide position specified by the detection value of the seat slide sensor 13, and the telescopic position specified by the detection value of the telescopic position sensor or steer position sensor 14. For example, the ROM 113 may pre-store a lookup table which describes the relationship among the seat slide position, telescopic position, height, and weight, and the height and weight of the driver may be estimated with reference to this table.

Alternatively, the image of the driver may be detected using the image sensor 16 which is arranged to face the driver, and the physical construction of the driver may be estimated based on this detection result. For example, a plurality of template images of typical drivers who have different genders and physical constructions may be stored in advance, and the gender and physical construction corresponding to a template image, which has the highest similarity to the image obtained by the image sensor 16 by a known pattern matching method, may be specified.

In step S103, the CPU 111 calculates the rigidity coefficient K, viscosity coefficient B, and inertia coefficient M as characteristic values of the human impedance based on the physical construction estimation result in step S102. In this embodiment, the CPU 111 can specify these coefficients by looking up the human impedance calculation LUT 115 stored in the ROM 113.

FIGS. 4A to 4C show examples of the data structures of the human impedance calculation LUT 115.

The human impedance calculation LUT 115 of this embodiment includes LUTs respectively for the rigidity coefficient K, viscosity coefficient B, and inertia coefficient M. FIGS. 4A to 4C respectively show the structure examples of the LUTs of the rigidity coefficient K, viscosity coefficient B, and inertia coefficient M. As shown in FIGS. 4A to 4C, coefficient values are arranged in correspondence with height and weight classes, and a corresponding coefficient can be output by inputting the height and weight. Also, as shown in FIGS. 4A to 4C, each LUT includes sub LUTs in correspondence with gender and age classes, and a sub LUT according to the gender and age may be looked up.

In step S104, the CPU 111 calculates the human impedance torque T by substituting the rigidity coefficient K, viscosity coefficient B, and inertia coefficient M specified in step S103 in equation (1) above.

In step S105, the CPU 111 calculates a target steering reaction force T0 from the human impedance torque T calculated in step S104. For example, T0 is given by:

$$T0=T+k$$

where k is a correction term including a predetermined constant.

Figure 5:
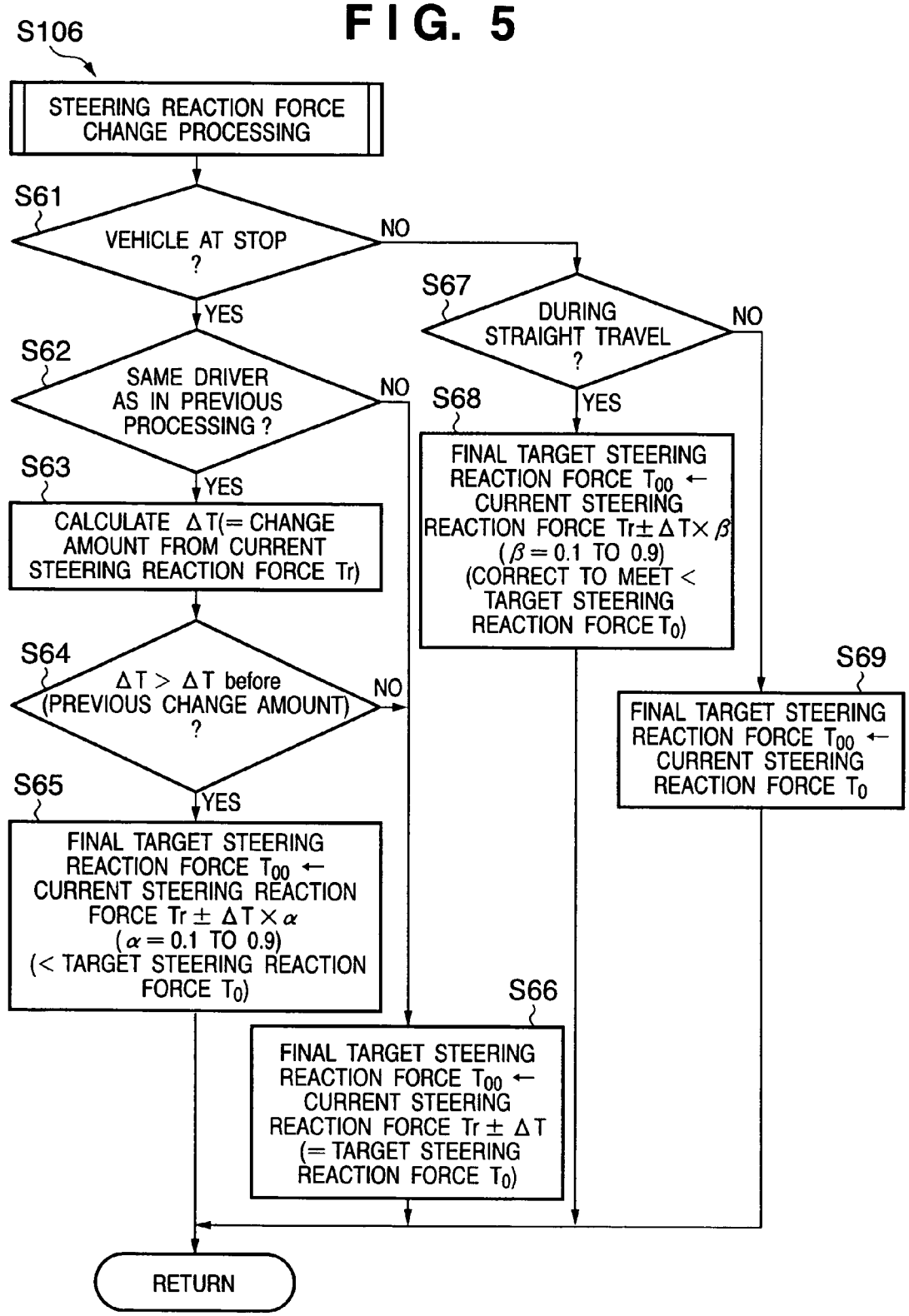
FIG. 5 is a flowchart showing an example of the steering reaction force change processing according to the first embodiment.

In step S106, the CPU 111 executes steering reaction force change processing. FIG. 5 shows the detailed sequence of this steering reaction force change processing.

The CPU 111 checks in step S61 based on the detection value of the vehicle velocity sensor 12 if the vehicle is at a stop now. If the vehicle is at a stop, the process advances to step S62; otherwise, the process advances to step S67.

The CPU 111 checks in step S62 if the driver is the same as that in the previous processing. When the driver's information can be read from the IC card reader 15, this checking processing can be done using this information. If the checking processing cannot be done using information from the IC card, whether or not the driver has the same physical construction may be determined using the image sensor 16, seat slide sensor 13, and the telescopic position sensor or steer position sensor 14. If the CPU 111 determines that the driver is the same as in the previous processing, the process advances to step S63; otherwise, the process advances to step S66.

In step S63, the CPU 111 calculates the amount of change $\Delta T(=T0-Tr)$ from the current steering reaction force Tr.

The CPU 111 checks in step S64 if $\Delta T$ is larger than a previous amount of change $\Delta Tbefore$. If $\Delta T$ is larger than the previous amount of change $\Delta Tbefore$, the process advances to step S65; otherwise, the process advances to step S66.

In step S65, the CPU 111 sets the current steering reaction force $Tr\pm\Delta T\times\alpha$ (for $0.1\leq\alpha\leq0.9$) as a final target steering reaction force T00. This T00 assumes a value smaller than the target steering reaction force T0 calculated in step S105.

In step S66, the CPU 111 sets $Tr\Delta\Delta T$ as the final target steering reaction force T00. This T00 is equal to the target steering reaction force T0 calculated in step S105.

If the vehicle is not at a stop in step S61, the process advances to step S67. The CPU 111 checks in step S67 based on the detection value of the steering angle sensor 3 if the vehicle is traveling straight. If the vehicle is traveling straight, the process advances to step S68; otherwise, the process advances to step S69.

In step S68, the CPU 111 sets the current steering reaction force $Tr\pm\Delta T\times\beta$ (for $0.1\leq\beta\leq0.9$) as the final target steering reaction force T00. This T00 assumes a value smaller than the target steering reaction force T0 calculated in step S105. Since it is not preferable to abruptly change the steering feeling even during straight travel, the value $\beta$ is preferably changed gradually.

In step S69, the CPU 111 sets the target steering reaction force T0 calculated in step S105 as the final target steering reaction force T00 intact. That is, the driver is steering at this time, and since it is not preferable to change the steering feeling, the steering reaction force is inhibited from being changed.

According to the first embodiment described above, a steering reaction force can be appropriately set in accordance with the driver.

Figure 6:
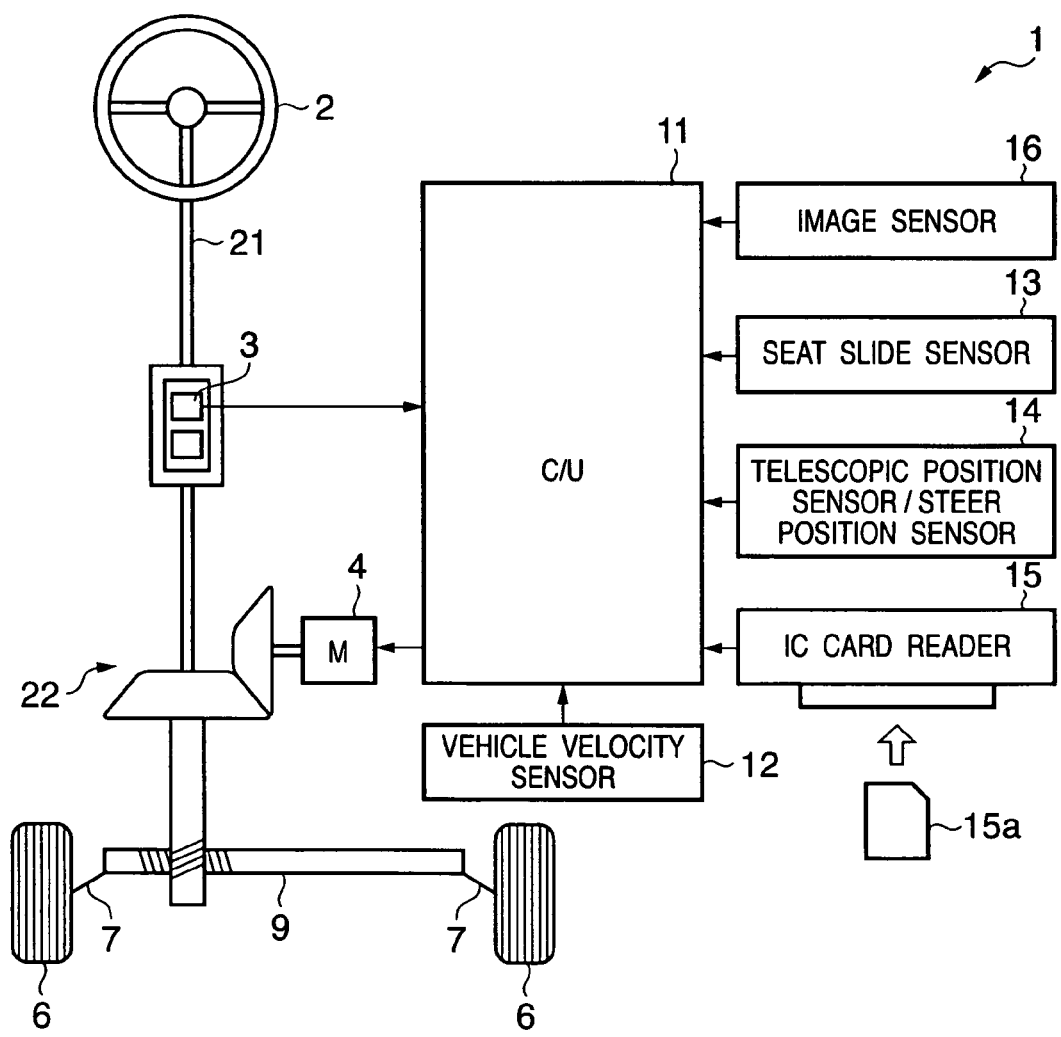
FIG. 6 is a schematic diagram showing the arrangement of the steering apparatus according to a modification of the first embodiment.

Note that the first embodiment described above has explained the steer-by-wire type steering apparatus, as shown in FIG. 1. However, the present invention is not limited to this. That is, as shown in FIG. 6, a conventional type steering apparatus in which the steering rod 9 is mechanically connected to the steering wheel 2 via a steering shaft 21 may be adopted. To add about the arrangement in case of the conventional type, the steering rod 9 is connected to the sheering shaft 21 via a reduction gear mechanism 22, and the steering reaction force generation motor 4 is configured to work on this reduction gear mechanism 22. With this arrangement, the aforementioned embodiment can be applied.

Second Embodiment

Figure 7:
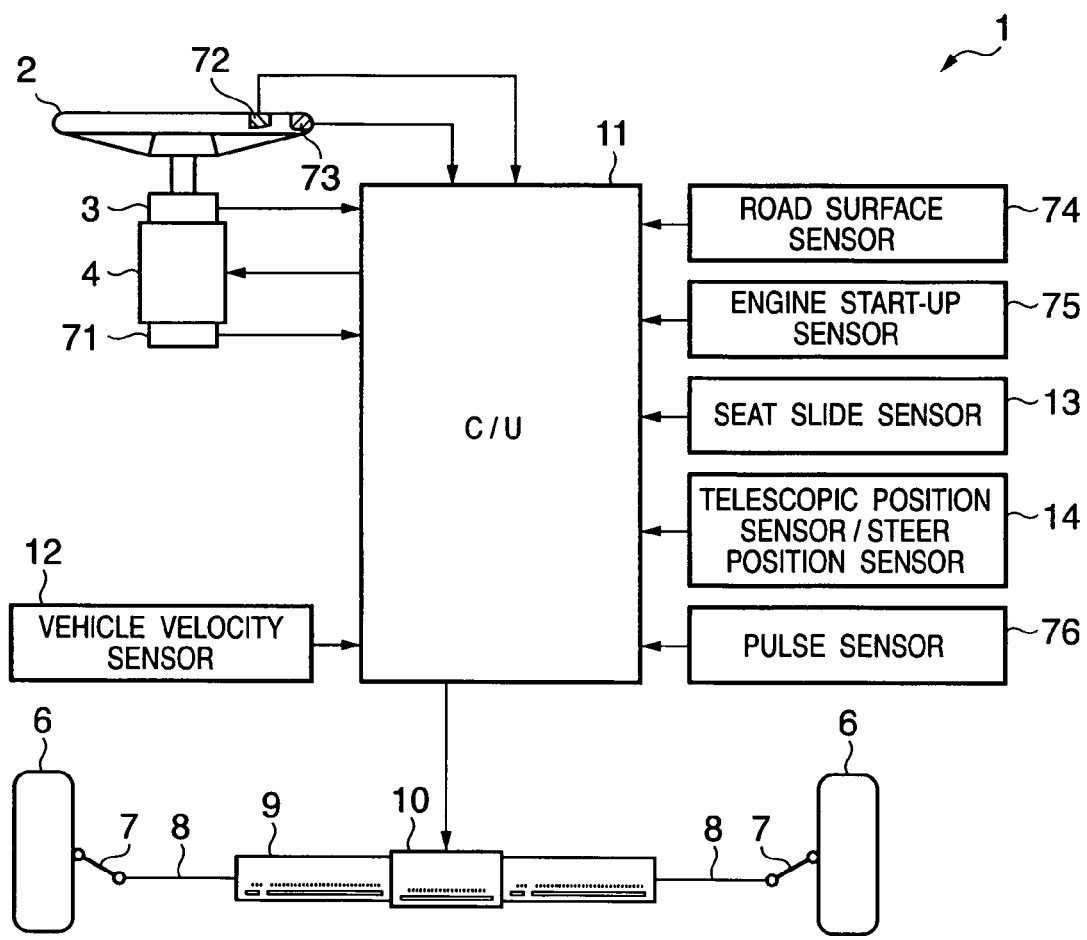
FIG. 7 is a schematic diagram showing the arrangement of a steering apparatus according to the second embodiment.

FIG. 7 is a schematic diagram showing the arrangement of the steering apparatus 1 of this embodiment. This steering apparatus 1 is of the steer-by-wire type as in FIG. 1. The same reference numerals in FIG. 7 denote the same components as those in FIG. 1, and a description thereof will be omitted. Components different from FIG. 1 will be described below.

A steering torque sensor 71 is attached to the steering wheel 2, and a pressure sensor 72 which detects the gripping state of the steering wheel by the driver, and an electrostatic sensor 73 which determines the gripping position of the steering wheel based on a change in capacitance are provided.

In addition, the steering apparatus 1 of this embodiment has a road surface sensor 74 which detects a low-μ road and road surface drop, an engine start-up sensor 75 which detects engine start-up, and a pulse sensor 76 which detects the tension level of the driver. When the vehicle is a so-called hybrid vehicle which uses an electric motor as a drive source in addition to an engine, the engine start-up sensor 75 detects ON of a start switch of the electric motor.

The aforementioned steering torque sensor 71, pressure sensor 72, electrostatic sensor 73, road surface sensor 74, engine start-up sensor 75, and pulse sensor 76 are connected to the control unit 11.

In this embodiment, the steering reaction force generation motor 4 is also used to forcibly turn the steering wheel 2 by a predetermined amount so as to estimate the human impedance, as will be described later.

The steering reaction force control of this embodiment will be described below.

Figure 8:
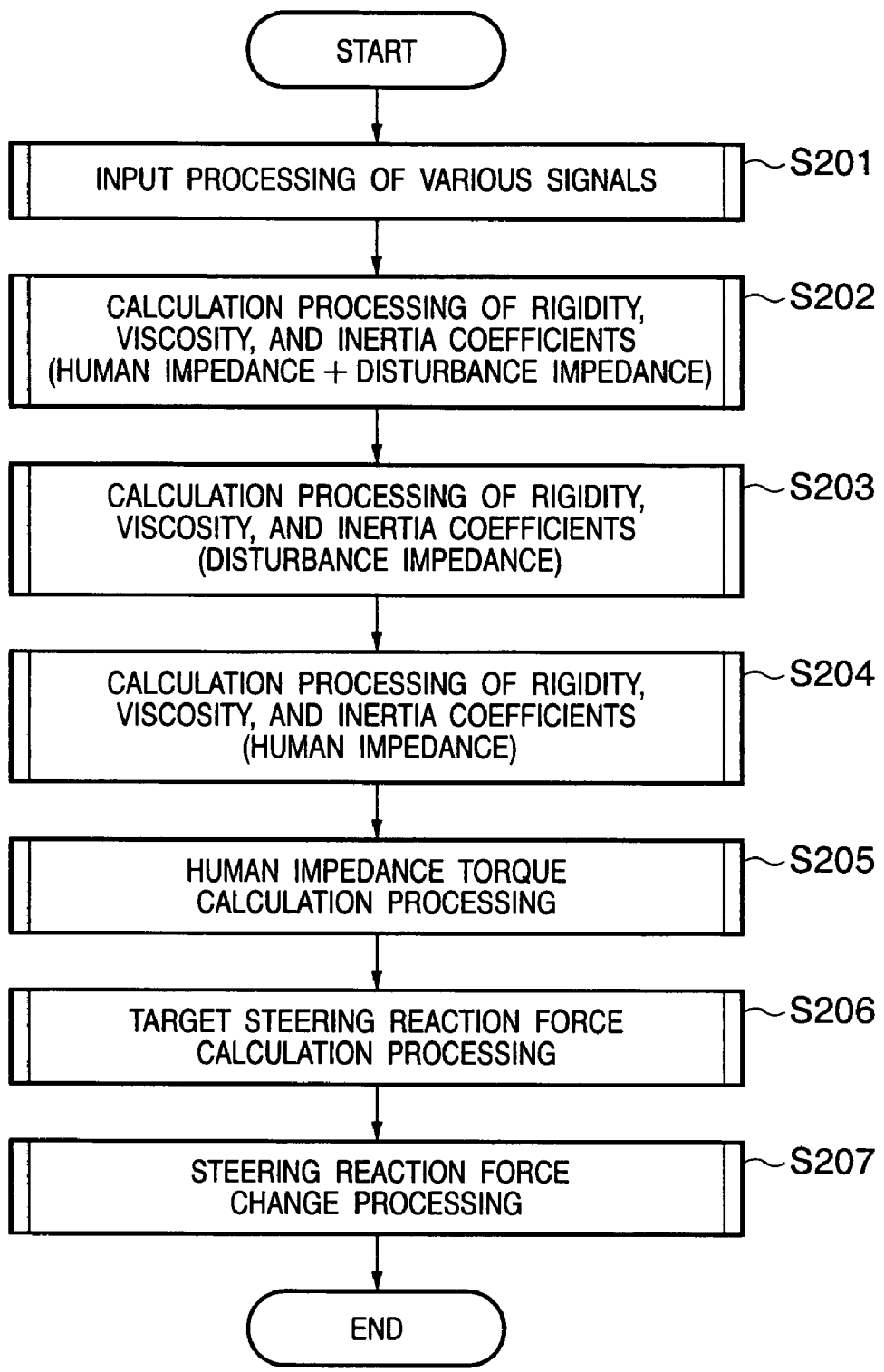
FIG. 8 is a flowchart showing the steering reaction force control processing according to the second embodiment.

FIG. 8 is a flowchart showing the steering reaction force control processing of this embodiment. Upon viewing this flow broadly, the CPU 111 executes the calculation processing of the rigidity coefficient, viscosity coefficient, and inertia coefficient, which represent the characteristics of the human impedance, in step S204 as in step S103 of the first embodiment (FIG. 3). However, in this embodiment, the CPU 111 forcibly turns the steering wheel 2 by a predetermined amount for the purpose of measurement, and calculates the human impedance based on the amount of steering which is applied by the driver in response to that turn, in place of the driver's physical construction unlike in the first embodiment. That is, a large difference from the first embodiment lies in that the human impedance is obtained by actual measurement. Upon obtaining the human impedance based on the actual measurement, a disturbance received from the vehicle must be taken into consideration. Hence, in steps S202 to S204, processing for removing a disturbance is added upon estimating the human impedance.

The processing in step S205 and subsequent steps is substantially the same as that in the first embodiment. That is, step S205 corresponds to the human impedance torque calculation processing in step S104 in the first embodiment (FIG. 3), step S206 corresponds to the target steering reaction force calculation processing in step S105, and step S207 corresponds to the steering reaction force change processing in step S106.

In step S201, the CPU 111 inputs the detection values of the steering angle sensor 3, seat slide sensor 13, telescopic position sensor or steer position sensor 14, steering torque sensor 71, pressure sensor 72, electrostatic sensor 73, road surface sensor 74, engine start-up sensor 75, and pulse sensor 76.

Subsequent steps S202 to S204 are associated with the calculation processing of the rigidity coefficient, viscosity coefficient, and inertia coefficient which represent the characteristics of the human impedance.

In step S202, the CPU 111 calculates human impedance including disturbance impedance. The "disturbance impedance" unit a resistance against the turn of the steering wheel which is caused by the disturbance of the vehicle.

Figure 9:
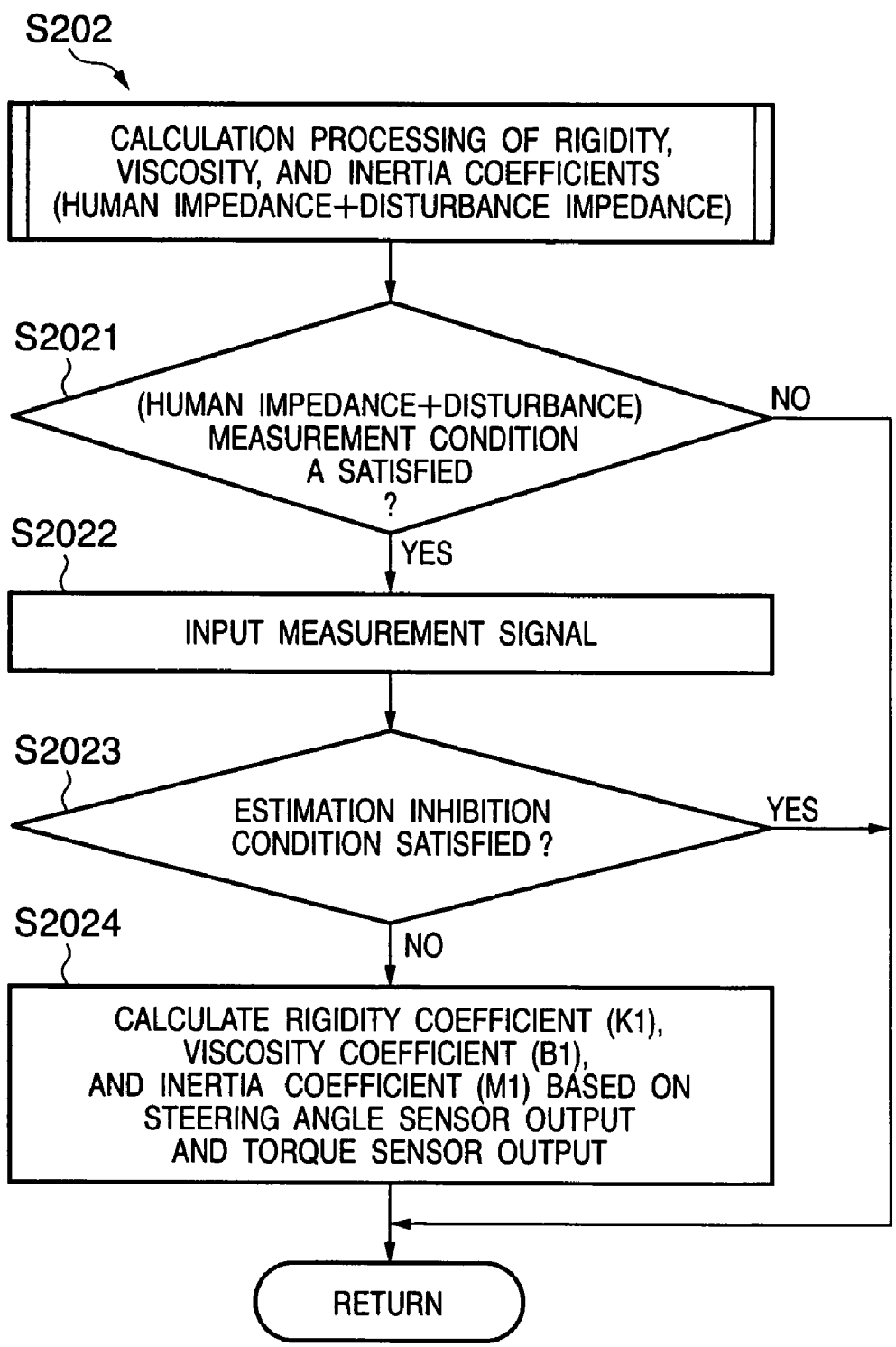
FIG. 9 is a flowchart showing a practical example of the processing for calculating a human impedance including a disturbance impedance according to the second embodiment.

FIG. 9 is a flowchart showing a practical example of the processing for calculating the human impedance including the disturbance impedance in step S202.

The CPU 111 checks in step S2021 if the following measurement conditions A are satisfied.

Measurement Conditions A:
(1) The driver grips the steering wheel 2, and
(2) the vehicle is in one of the following states (a) to (c)
  (a) at the engine start-up timing,
  (b) during a steady turn, or
  (c) after an elapse of a predetermined period of time in continuous travel.

Note that (1) whether or not the driver grips the steering wheel 2 can be determined by examining if the output from the pressure sensor 72 is equal to or larger than a predetermined value. Also, (2) (a) the engine start-up can be detected based on the output from the engine start-up sensor 75, and (b) the steady turn can be determined based on the outputs from the steering angle sensor 3 and vehicle velocity sensor 12.

Only when the measurement conditions A are satisfied, the process advances to step S2022; otherwise, the control exits this process (S202).

Figure 10A:
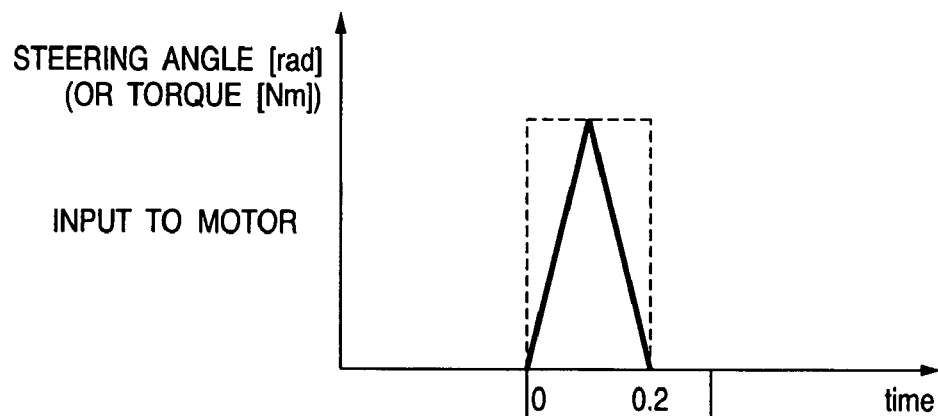
FIGS. 10A to 10C are graphs showing examples of a measurement signal, steering angle sensor output, and steering torque sensor output according to the second embodiment.
Figure 10B:
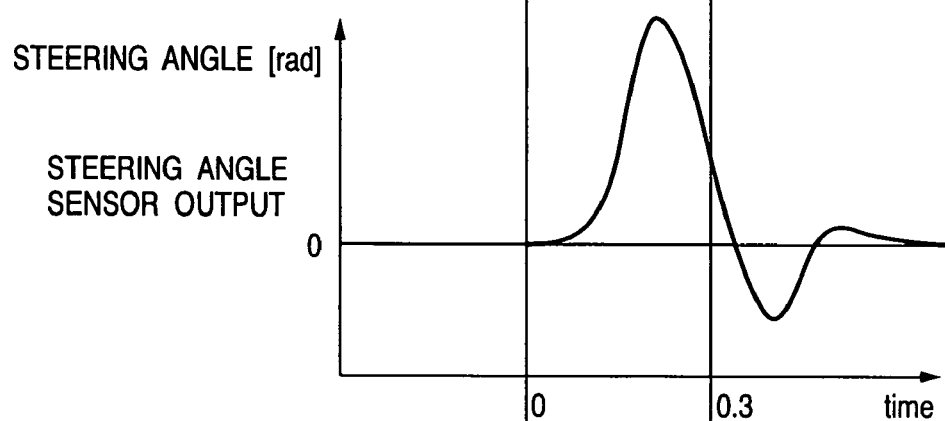
Figure 10C:
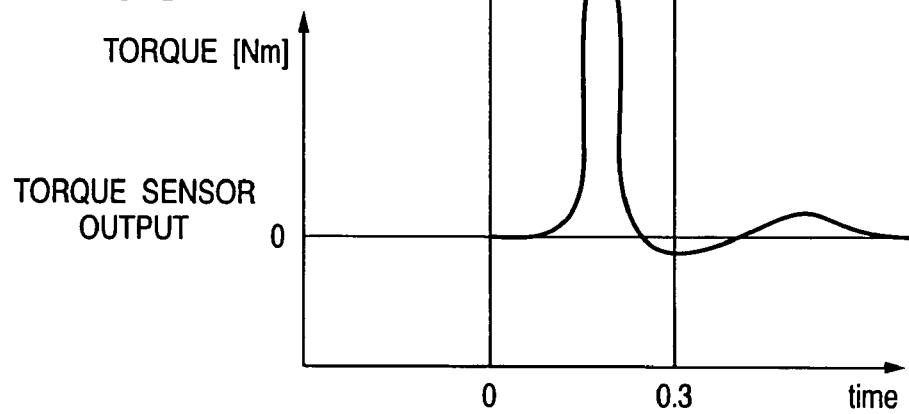

In step S2022, the CPU 111 generates a measurement signal for driving the steering reaction force generation motor 4 so as to forcibly turn the steering wheel 2 a predetermined amount. Note that the steering behavior of the driver who reacted the steering wheel 2, which was forcibly turned by the generated measurement signal, appears in the outputs from the steering angle sensor 3 and the steering torque sensor 71. FIGS. 10A to 10C show examples of such state.

FIG. 10A shows the measurement signal, FIG. 10B shows the output from the steering angle sensor 3, and FIG. 10C shows the output from the steering torque sensor 71. As shown in FIG. 10A, the measurement signal is desirably a pulse signal. An example indicated by the solid line in FIG. 10A is a triangular wave pulse, but a rectangular wave pulse may be used, as indicated by the dotted line. Also, it is preferable that this pulse width is 0.4 sec or shorter, and a change in steering angle at that time is 5° or less or the steering torque falls within the range from 1.5N to 3N (both inclusive). More preferably, the pulse width is about 0.2 sec, as shown in FIG. 10A, and a change in steering angle at that time is about 2° or the steering torque is about 2N.

The CPU 111 checks in step S2023 if the following estimation inhibition condition is satisfied.

Estimation Inhibition Condition:
One of the following (a) and (b) is to be satisfied.
(a) The pulse value detected by the pulse sensor 76 exceeds a predetermined value, and it is determined that the tension level of the driver is high.
(b) The road surface μ detected by the road surface sensor 74 is lower than a predetermined value.

If the above condition is satisfied, the CPU 111 determines that the human impedance cannot be stably estimated, and the control exits this process (S202). In this way, if the above condition is satisfied, estimation of the human impedance is inhibited.

If the estimation inhibition condition is not satisfied, the process advances to step S2024. The steering behavior of the driver who reacted the steering wheel 2, which was forcibly turned by the generated measurement signal, appears in the outputs from the steering angle sensor 3 and the steering torque sensor 71. In step S2024, the CPU 111 calculates a rigidity coefficient K1, viscosity coefficient B1, and inertia coefficient M1 using the outputs from the steering angle sensor 3 and the steering torque sensor 71 shown in, e.g., FIGS. 10A to 10C.

FIG. 11 is a flowchart showing an example of the calculation sequence of the respective coefficients in step S2024.

In step S241, the CPU 111 detects the steering angle $\theta$, steering angle change rate $\dot\theta$, and steering angle change acceleration $\ddot\theta$ from the outputs of the steering angle sensor 3 upon respective measurements, and also detects an output TR of the steering torque sensor 71.

Figure 12:
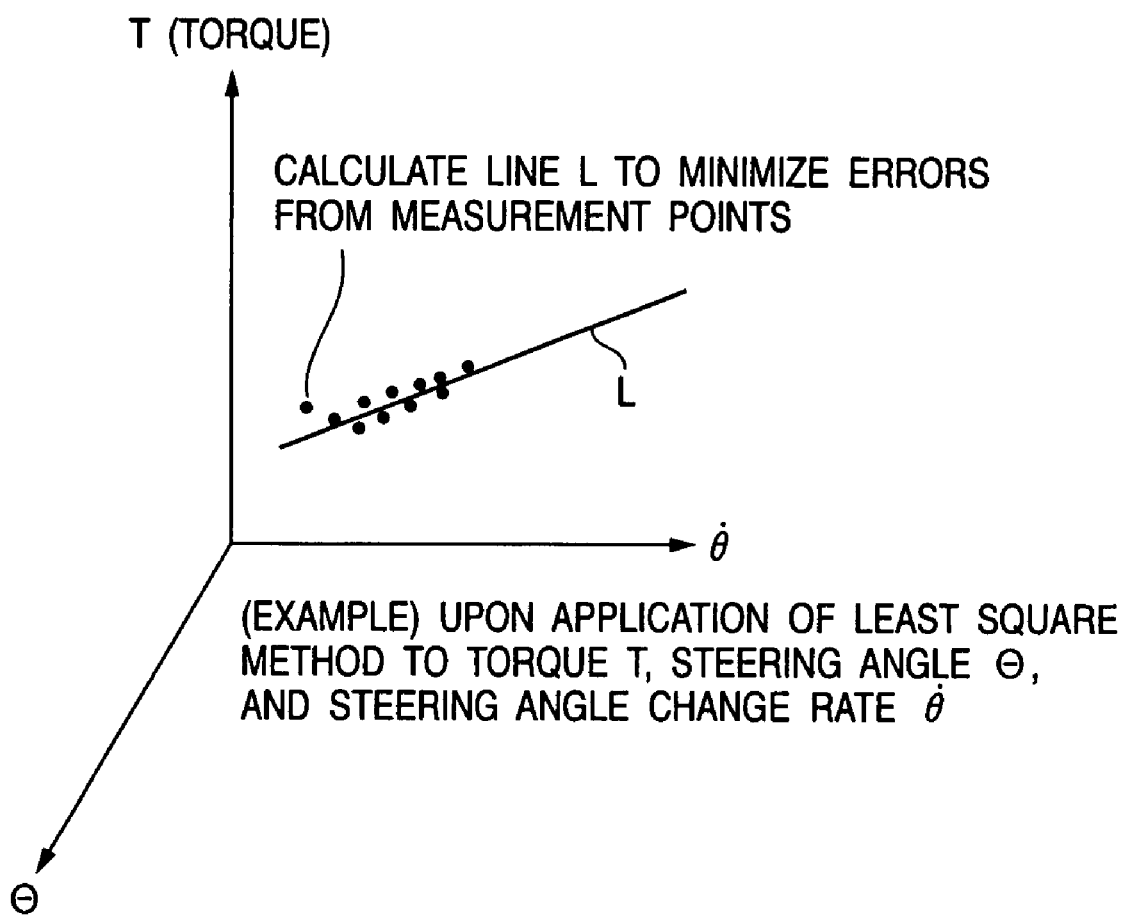
FIG. 12 is a view for explaining the calculation sequence of the rigidity coefficient, viscosity coefficient, and inertia coefficient according to the second embodiment.

In step S242, the CPU 111 calculates an approximated curve L using the least square method so that errors from respective measurement points in a space formed by the $\theta$, $\dot\theta$, and $\ddot\theta$, and the torque TR detected in step S241. FIG. 12 illustrates an example of this arithmetic operation. By applying the least square method to a three-dimensional space defined by $\theta$, $\dot\theta$, and TR, a straight line L which minimizes errors from respective measurement points can be obtained.

Figure 13A:
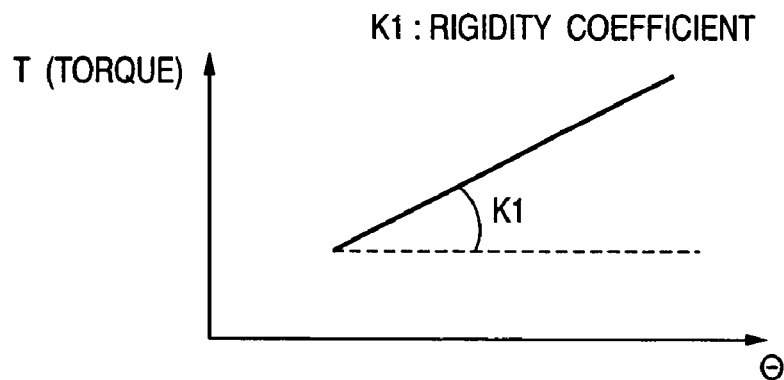
FIGS. 13A to 13C are graphs for explaining the calculation sequence of the rigidity coefficient, viscosity coefficient, and inertia coefficient according to the second embodiment.
Figure 13B:
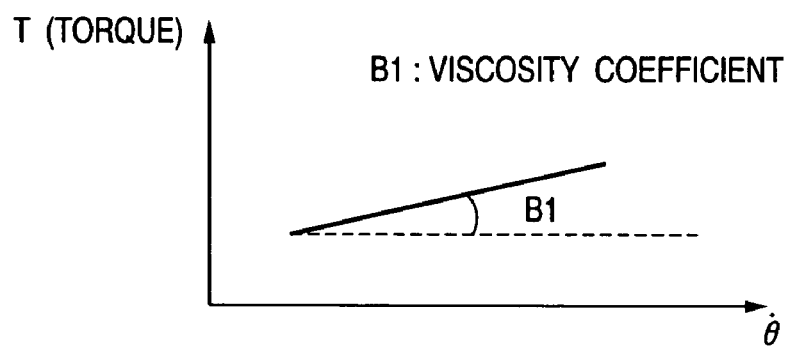
Figure 13C:
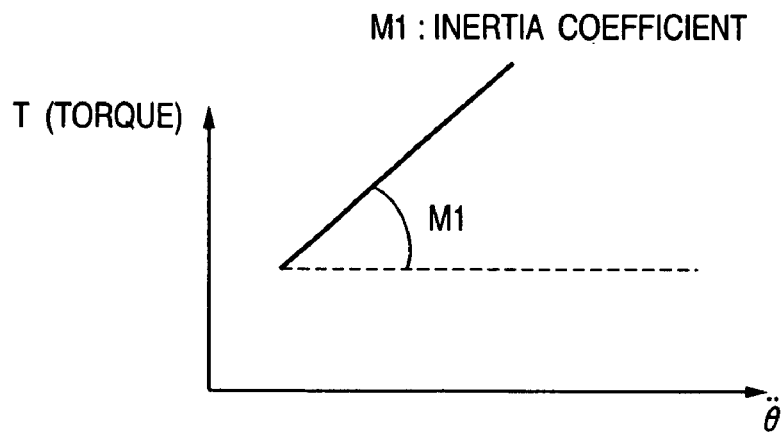

Next, in step S243 the CPU 111 calculates the rigidity coefficient K1 based on the slope of the approximated straight line L calculated in step S242 on a $\theta$-T coordinate plane, as shown in FIG. 13A. In step S244, the CPU 111 calculates the viscosity coefficient B1 based on the slope of the approximated straight line L calculated in step S242 on a $\dot\theta$-T coordinate plane, as shown in FIG. 13B. Finally, in step S245 the CPU 111 calculates the inertia coefficient M1 based on the slope of the approximated straight line L calculated in step S242 on a $\ddot\theta$-T coordinate plane, as shown in FIG. 13C.

In this manner, the CPU 111 calculates the rigidity coefficient K1, viscosity coefficient B1, and inertia coefficient M1 in step S2024 in FIG. 9.

The process advances to step S203 in FIG. 8. In step S203, the CPU 111 executes processing for calculating the disturbance impedance. This processing step must be executed while the driver releases the steering wheel 2. In this sense, this processing step need not always be executed in the processing flow of FIG. 8, and it may be executed in advance before factory shipping of the vehicle.

Figure 14:
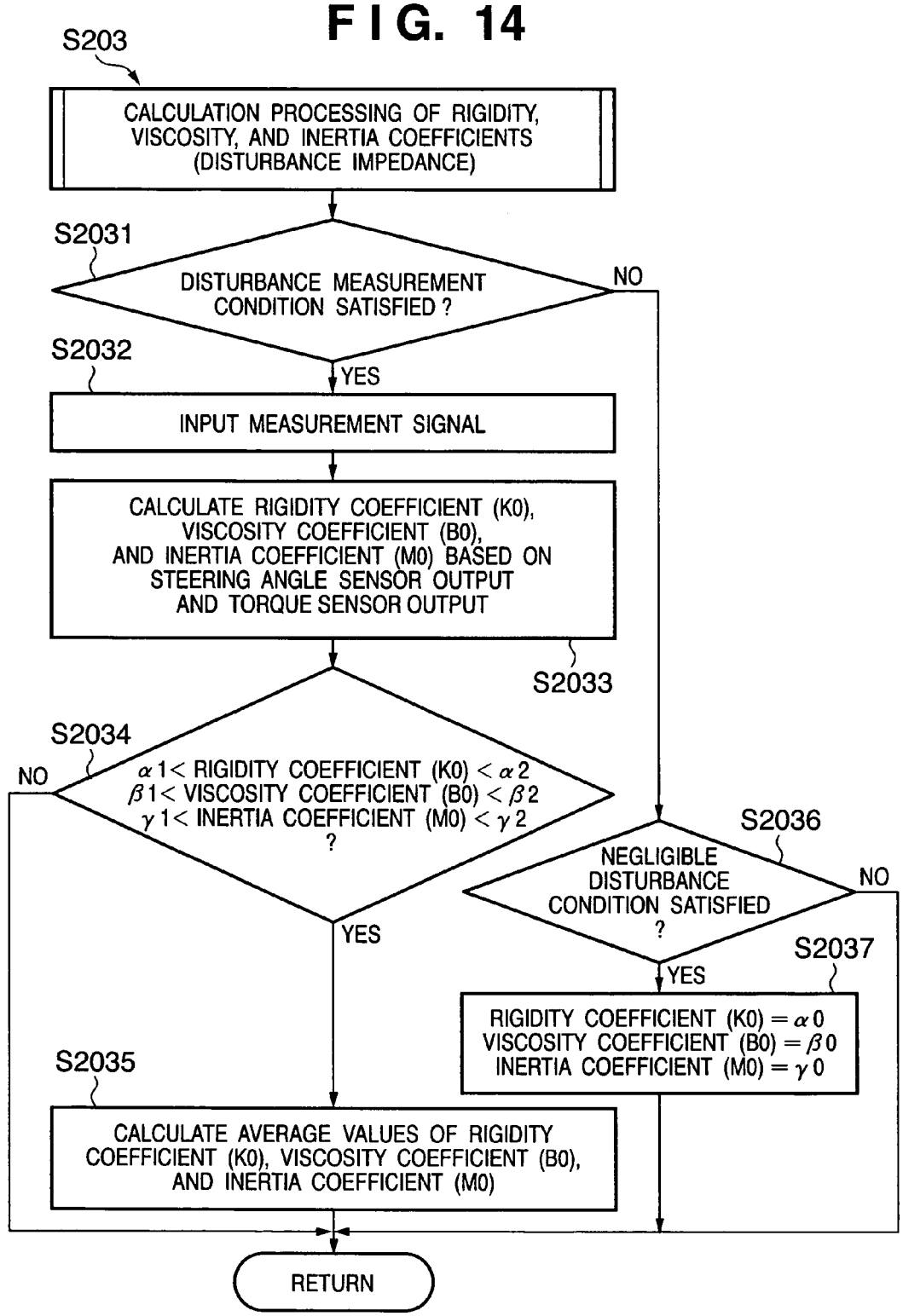
FIG. 14 is a flowchart showing a practical example of the processing for calculating disturbance impedance according to the second embodiment.

FIG. 14 is a flowchart showing a practical example of the processing for calculating the disturbance impedance in step S203.

The CPU 111 checks in step S2031 if any of the following measurement conditions B (disturbance measurement conditions) are satisfied.

Measurement Conditions B:
(1) The vehicle is at a stop, and
(2) the driver is not gripping the steering wheel 2.

Note that (2) whether or not the driver grips the steering wheel 2 is determined based on the detection value of the pressure sensor 72. If the measurement conditions 2 are satisfied, the process advances to step S2032; otherwise, the process advances to step S2036.

In step S2032, the CPU 111 generates a measurement signal for driving the steering reaction force generation motor 4 so as to forcibly turn the steering wheel 2 by a predetermined amount as in step S2022 in FIG. 9. Note that the steering wheel 2 is forcibly turned in accordance with the generated measurement signal, and the steering behavior due to a disturbance at that time appears in the outputs from the steering angle sensor 3 and steering torque sensor 71.

In step S2033, the CPU 111 calculates a rigidity coefficient K0, viscosity coefficient B0, and inertia coefficient M0 by the same method as in step S2024 in FIG. 9 (e.g., the method described using FIGS. 11 to 13C).

The CPU 111 determines in step S2034 if the calculated rigidity coefficient K0, viscosity coefficient B0, and inertia coefficient M0 respectively fall within predetermined ranges.

That is, the CPU 111 checks if the rigidity coefficient K0, viscosity coefficient B0, and inertia coefficient M0 satisfy all the following relations:

$$\alpha 1 < K0 < \alpha 2$$

$$\beta 1 < B0 < \beta 2$$

$$\gamma 1 < M0 < \gamma 2$$

If a coefficient which falls outside the predetermined range is calculated, it is determined that such coefficient is a detection error, and the control exits this process (S203). If the respective coefficients fall within the predetermined ranges, the process advances to step S2035.

In step S2035, the CPU 111 calculates the average values of the rigidity coefficient K, viscosity coefficient B0, and inertia coefficient M0 for a predetermined number of times. In this way, the impedance of a steady disturbance can be calculated.

On the other hand, if the measurement conditions B are not satisfied in step S2031, the process advances to step S2036, and the CPU 111 checks if the following measurement condition C (negligible disturbance condition) is satisfied.

Measurement Condition C:
(1) A high-speed straight travel is in progress, or
(2) a steady turn within a given angle range is in progress.

Note that (1) whether or not the high-speed straight travel is in progress, and (2) whether or not the steady turn within the given angle range is in progress can be determined based on the outputs from the vehicle velocity sensor 12 and steering angle sensor 3.

If the measurement condition C is satisfied, the process advances to step S2037, and the CPU 111 respectively sets the rigidity coefficient K0, viscosity coefficient B0, and inertia coefficient M0 to be predetermined constants α0, β0, and γ0. After that, the control exits this process (S203). On the other hand, if the measurement condition C is not satisfied, the control exits this process (S203) without any processing.

As described above, the CPU 111 calculates the rigidity coefficient K0, viscosity coefficient B0, and inertia coefficient M0 associated with the disturbance impedance in step S203 in FIG. 8.

Figure 15:
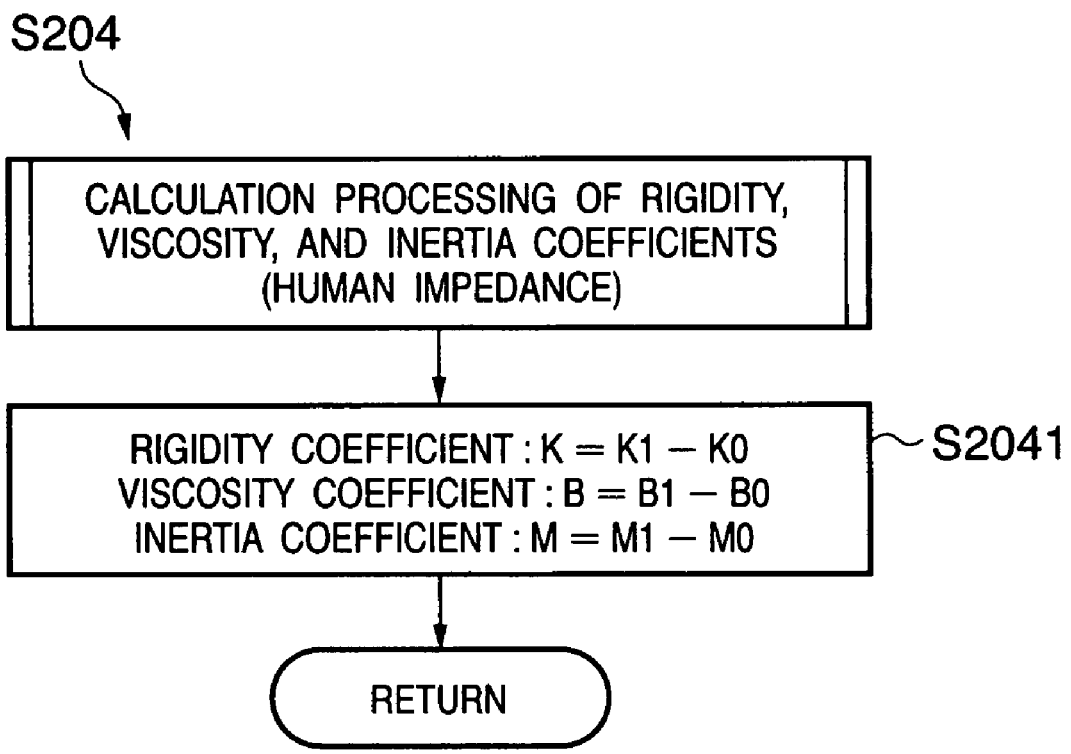
FIG. 15 is a flowchart showing a practical example of the processing for calculating human impedance free from the influence of any disturbance according to the second embodiment.

The process advances to step S204 in FIG. 8, and the CPU 111 calculates human impedance free from the influence of any disturbance. FIG. 15 shows a practical example of step S204. As shown in FIG. 15, the CPU 111 calculates a rigidity coefficient K, viscosity coefficient B, and inertia coefficient M (step S2041) by:

Rigidity coefficient K: $K = K1 - K0$

Viscosity coefficient B: $B = B1 - B0$

Inertia coefficient M: $M = M1 - M0$

In this way, the human impedance free from the influence of any disturbance can be calculated.

The process then advances to step S205 in FIG. 8. As described above, the processing in step S205 and subsequent steps is substantially the same as that in the first embodiment. That is, step S205 corresponds to the human impedance torque calculation processing in step S104 in the first embodiment (FIG. 3), step S206 corresponds to the target steering reaction force calculation processing in step S105, and step S207 corresponds to the steering reaction force change processing in step S106. Hence, a description of these steps S205 to S207 quotes that of steps S104 to S106 in the first embodiment, and a description thereof will be omitted.

According to the second embodiment, a steering reaction force can be appropriately set in accordance with the driver.

Note that the second embodiment described above has explained the steer-by-wire type steering apparatus shown in FIG. 7. However, this embodiment can also be applied to a conventional type steering apparatus similar to that shown in FIG. 6.

Third Embodiment

The third embodiment is a variation of the aforementioned second embodiment. FIG. 10A shows the example of the measurement signal, and this measurement signal may be corrected according to a situation.

For example, upon generating the measurement signal in step S2022 in FIG. 9, the travel state of the vehicle is detected, and the measurement signal is corrected according to the detected travel state. More specifically, it is desirable to correct the measurement signal to have a larger amplitude in the following travel state:
(a) when the road surface μ detected by the road surface sensor 74 is lower than a predetermined value;
(b) when the steering angle detected by the steering angle sensor 3 is larger than a predetermined value during a steady turn or after an elapse of a predetermined period of time in continuous travel; or
(c) when the vehicle velocity detected by the vehicle velocity sensor 12 exceeds a predetermined value.

It is considered that the influence of a disturbance of the vehicle becomes large in the aforementioned cases.

In addition to the travel state, similar correction may be applied according to the driver's state. For example, it is desirable to correct the measurement signal to have a larger amplitude in the following driver's state:
(a) when it is determined based on the output from the pressure sensor 72 that the driver holds the steering wheel 2 with not both but a single hand;
(b) when the pulse value detected by the pulse sensor 76 is lower than a predetermined value, and it is determined that the tension level of the driver is low.
(c) when the gripping positions of the steering wheel 2 detected by the electrostatic sensor 73 are located in the up-and-down direction instead of the right-and-left direction.

In the aforementioned cases, since it is determined that the driver has a low ability to sense the forced turn of the steering wheel 2, it is preferable to increase the amplitude of the measurement signal.

In this way, the strength of the forced turn of the steering wheel can be surely transmitted to the driver within the range which does not make the driver feel uneasy and without any influence of a disturbance and the like.

Fourth Embodiment

Figure 16A:
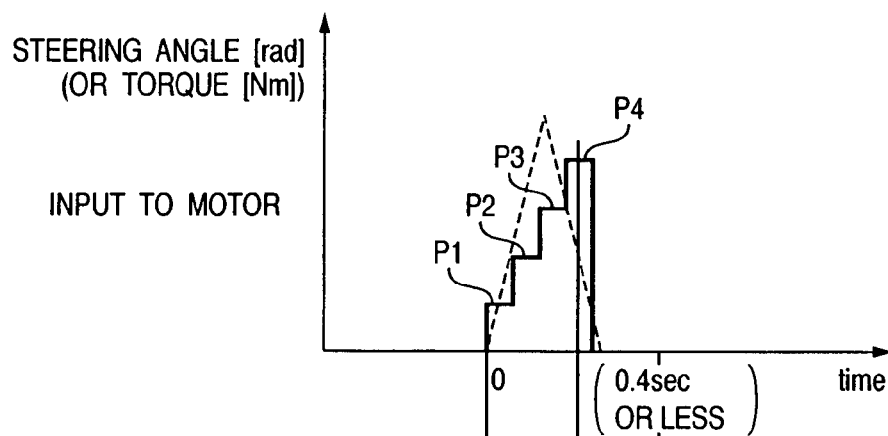
FIGS. 16A to 16C are graphs showing examples of a measurement signal, steering angle sensor, and steering torque sensor according to the fourth embodiment.
Figure 16B:
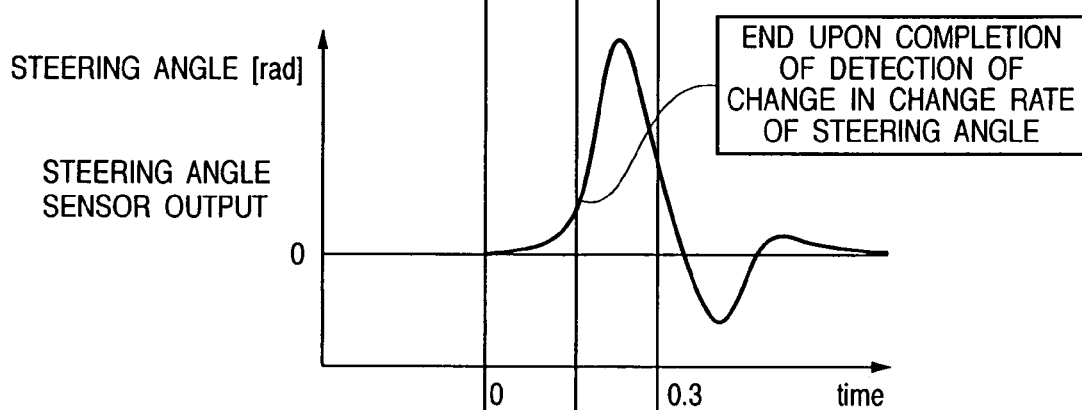
Figure 16C:
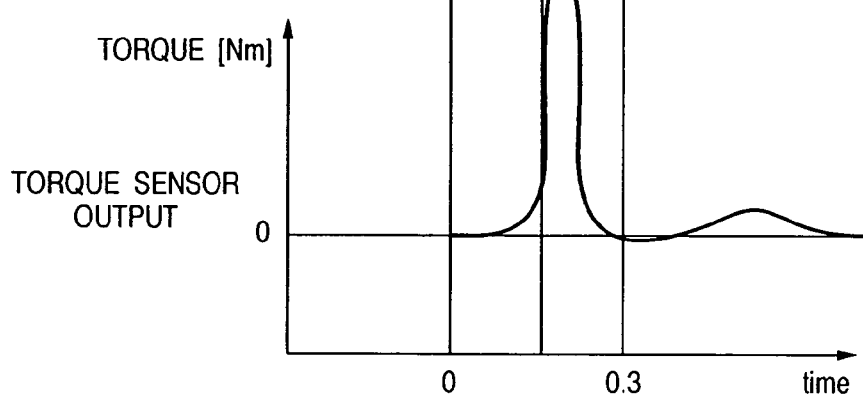

The fourth embodiment is a variation of the second embodiment. FIGS. 16A to 16C show examples of a measurement signal, steering angle sensor output, and steering torque sensor output according to this embodiment, and are similar to FIGS. 10A to 10C.

This example is wherein the amplitude of the measurement signal is gradually increased. For example, as shown in FIG. 16A, rectangular wave pulses each having a pulse width of, e.g., about 0.1 sec are continuously output while increasing their amplitudes (P1, P2, P3, P4 . . . .) If the pulse amplitude is as small as P1, the force of the forced turn of the steering wheel 2 is weak, and may not be perceived by the driver. However, when the pulse amplitude is increased like P2 and P3, a driver's reaction can be obtained (FIGS. 16B and 16C). As a result, for example, when it is detected based on the output from the steering angle sensor 3 that the steering angle change rate has changed to exceed a predetermined value, generation of the measurement signal can be stopped at that time.

In this way, wasteful generation of the measurement signal can be suppressed, and the human impedance can be efficiently measured.

Fifth Embodiment

The fifth embodiment is a variation of the second embodiment. In this embodiment, a signal specialized to frequency components effective to estimate the rigidity coefficient, viscosity coefficient, and inertia coefficient is generated as a measurement signal.

For example, a single wave as a series of pulse signals is generated as a measurement signal, as shown in FIG. 17A1. This signal corresponds to three-band frequencies which respectively correspond to an inertia term, viscosity term, and rigidity term that represent the characteristics of the human impedance. A driver's reaction in response to this signal appears as the steering angle sensor output and steering torque sensor output, as shown in FIGS. 17B1 and 17C1. Alternatively, a mixed wave obtained by mixing respective pulses in FIG. 17A1 may be generated as a measurement signal, as shown in FIG. 17A2. A driver's reaction in response to this signal appears as the steering angle sensor output and steering torque sensor output, as shown in FIGS. 17B2 and 17C2.

Figure 18:
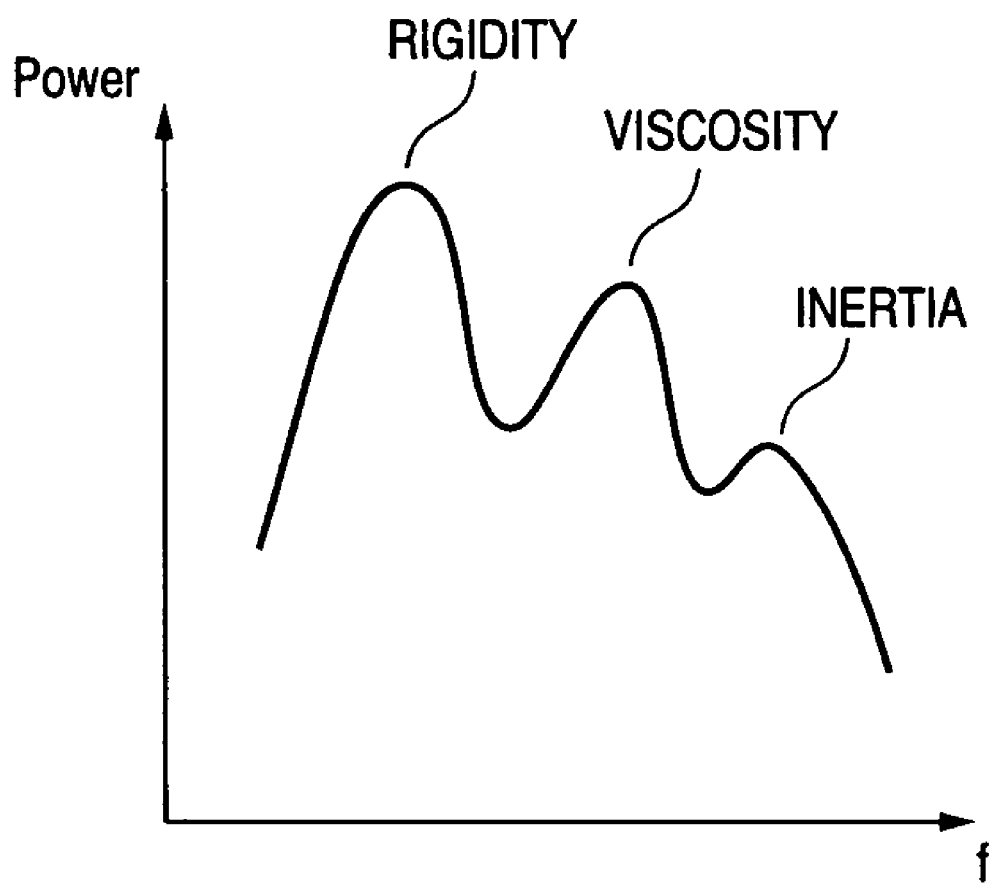
FIG. 18 is a graph showing an example of an envelope of the frequency spectrum of a steering angle sensor output signal according to the fifth embodiment.

The control unit 11 converts the output signal from the steering angle sensor 3 shown in FIG. 17B1 or 17B2 into a frequency spectrum signal. FIG. 18 shows an example of an envelope of that frequency spectrum. As shown in FIG. 18, three envelope peaks are observed in this envelope. Typically, such peaks appear in the vicinity of 10 Hz, 20 Hz, and 30 Hz, and respectively include features of the rigidity coefficient, viscosity coefficient, and inertia coefficient. In other words, this envelope is a signal of three-band frequencies which respectively correspond to the inertia term, viscosity term, and rigidity term that represent the characteristics of the human impedance. Hence, respective peaks are extracted using a bandpass filter. A robust estimation method as a parameter estimation method similar to the least square method in the second embodiment is applied to the respective extracted waveforms, thereby estimating the rigidity coefficient K1, viscosity coefficient B1, and inertia coefficient M1.

With this processing, the rigidity coefficient, viscosity coefficient, and inertia coefficient as the characteristics of the human impedance can be efficiently calculated.

Sixth Embodiment

Figure 19A:
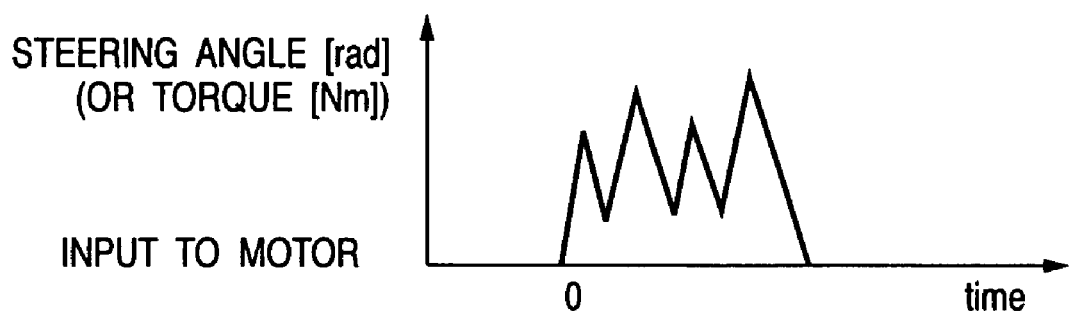
FIGS. 19A to 19C are graphs showing examples of a measurement signal, steering angle sensor, and steering torque sensor according to the sixth embodiment.
Figure 19B:
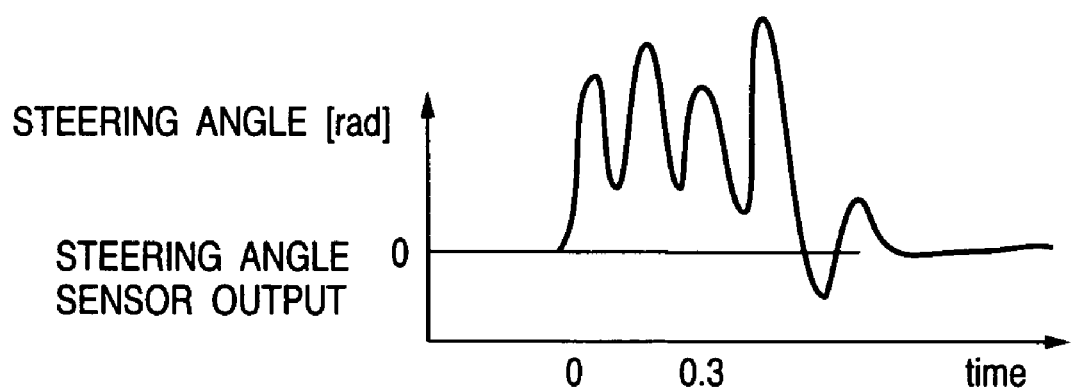
Figure 19C:
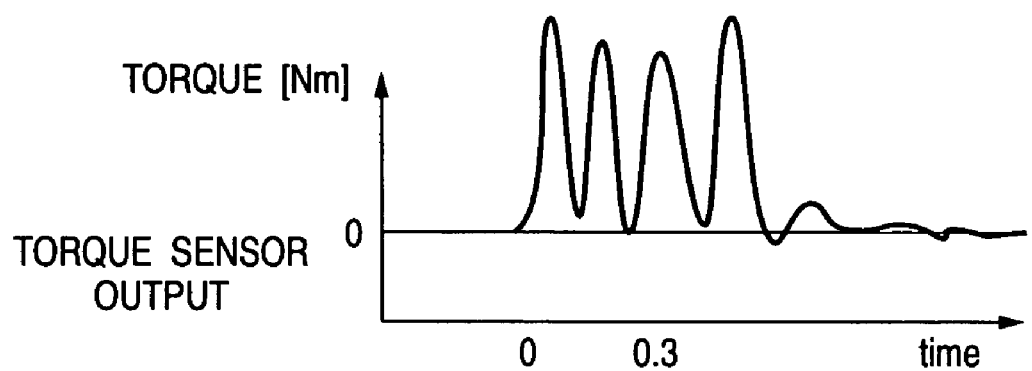

The sixth embodiment is a variation of the second embodiment. This embodiment generates a signal which simulates a road surface reaction force as a measurement signal. FIG. 19A shows an example of a measurement signal which simulates a road surface. A driver's reaction in response to this signal appears as the steering angle sensor output and steering torque sensor output, as shown in FIGS. 19B and 19C.

According to the measurement signal which simulates the road surface reaction force, the forced turn of the steering wheel 2 required to measure the human impedance also simulates the road surface reaction force. Therefore, the turn of the steering wheel 2 required for measurement never makes the driver feel uneasy.

Seventh Embodiment

The human impedance calculation processing (see flowcharts of FIGS. 8 and 9) in the second embodiment generates a measurement signal which drives the steering reaction force generation motor 4 (step S2022 in FIG. 9) so as to forcibly turn the steering wheel 2 by a predetermined amount, and estimates the human impedance based on the amount of steering manipulation which is applied in response to the turn of the steering wheel 2 by driving the steering reaction force generation motor 4 according to the measurement signal (step S2024).

By contrast, the seventh and eighth embodiments propose a method of obviating the need for processing for forcibly turning the steering wheel as a trigger which makes the driver perform a steering manipulation or the like. That is, the seventh and eighth embodiments will explain a method of detecting the amount of steering manipulation which is applied at a predetermined timing, and estimating the human impedance based on this manipulation amount.

This embodiment uses a kick back upon passage of the vehicle over the road surface drop as a trigger which makes the driver perform a steering manipulation. That is, the "predetermined timing" is that associated with passage of the vehicle over the road surface drop.

Figure 20:
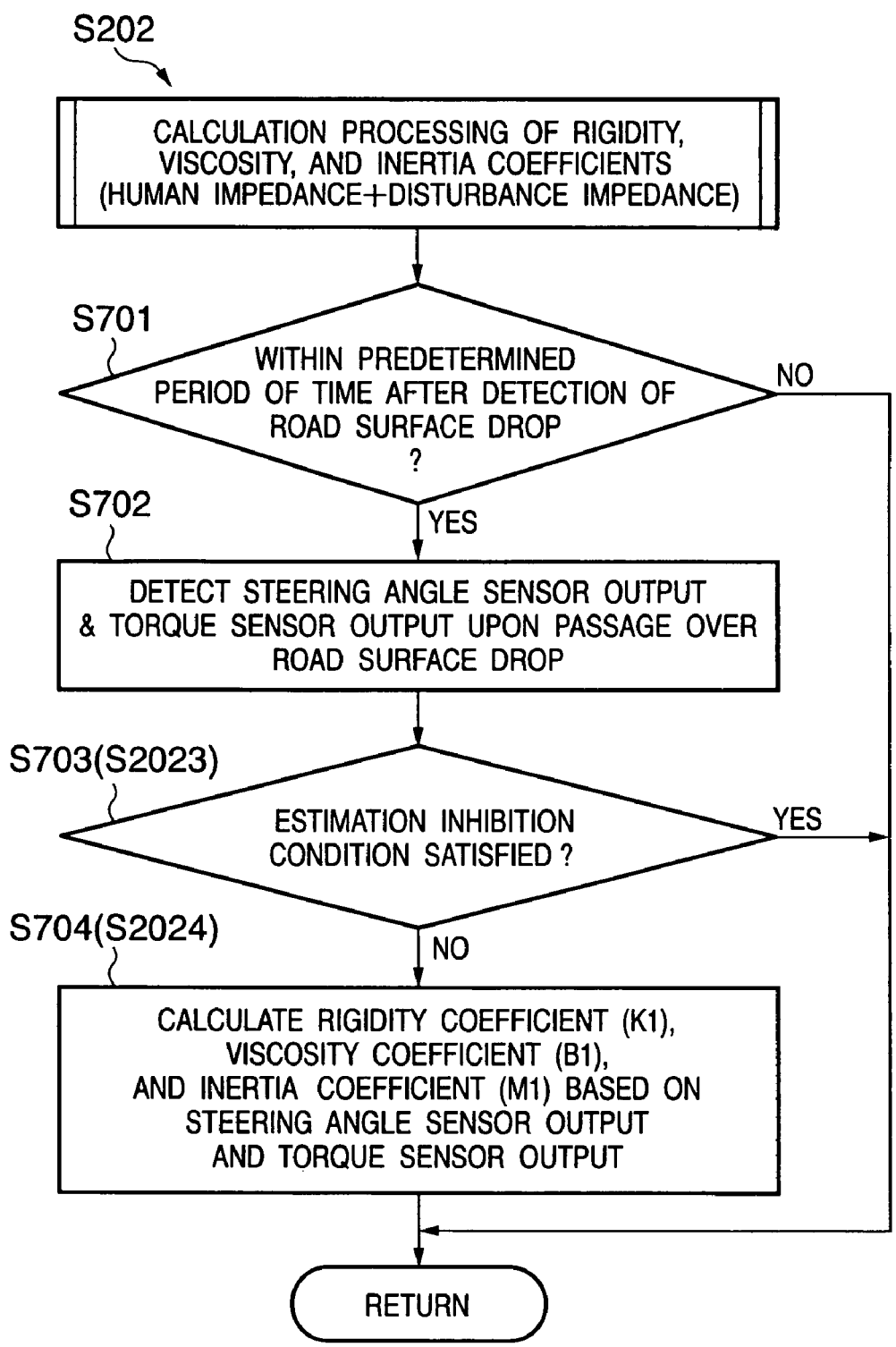
FIG. 20 is a flowchart showing a practical example of the processing for calculating human impedance including disturbance impedance according to the seventh embodiment.

FIG. 20 is a flowchart showing a practical example of the processing for calculating human impedance including a disturbance impedance (step S202 in FIG. 8) in this embodiment, and becomes a substitute of FIG. 9.

In step S701, the CPU 111 detects the road surface drop based on the output from the road surface sensor 74. For example, when the output from the road surface sensor 74 exceeds a predetermined value, the road surface drop is determined. The CPU 111 then checks if a predetermined period of time does not elapse after detection of the road surface drop. Only when the CPU 111 determines that the predetermined period of time does not elapse after detection of the road surface drop, the processing in step S702 and subsequent steps is executed; otherwise, the control exits this process.

Upon passage over the road surface drop, the steering wheel 2 receives a kick back. It is considered that the driver makes a steering manipulation in response to this kick back. In step S702, the CPU 111 detects the output from the steering angle sensor 3 and the output from the steering torque sensor 71 upon passage over the road surface drop.

Next, the CPU 111 checks in step S703 if the following estimation inhibition condition is satisfied.

Estimation Inhibition Condition:
At least any of the following (a) and (b) is to be satisfied.
(a) The pulse value detected by the pulse sensor 76 exceeds a predetermined value, and it is determined that the tension level of the driver is high.
(b) The road surface µdetected by the road surface sensor 74 is lower than a predetermined value.

If the above condition is satisfied, since it is determined that the human impedance cannot be stably estimated, the control exits this process.

On the other hand, if the above condition is not satisfied, the process advances to step S704, and the CPU 111 calculates the rigidity coefficient K1, viscosity coefficient B1, and inertia coefficient M1 as in step S2024 described above.

As described above, according to this embodiment, a kick back upon passage of the vehicle over the road surface drop can be used as a trigger which makes the driver perform a steering manipulation. Therefore, the need for independent processing for forcibly turning the steering wheel as a trigger which makes the driver perform a steering manipulation can be obviated. In this way, the amount of steering manipulation can be measured by a simple arrangement.

Eighth Embodiment

The eighth embodiment is a variation of the seventh embodiment.

Figure 21:
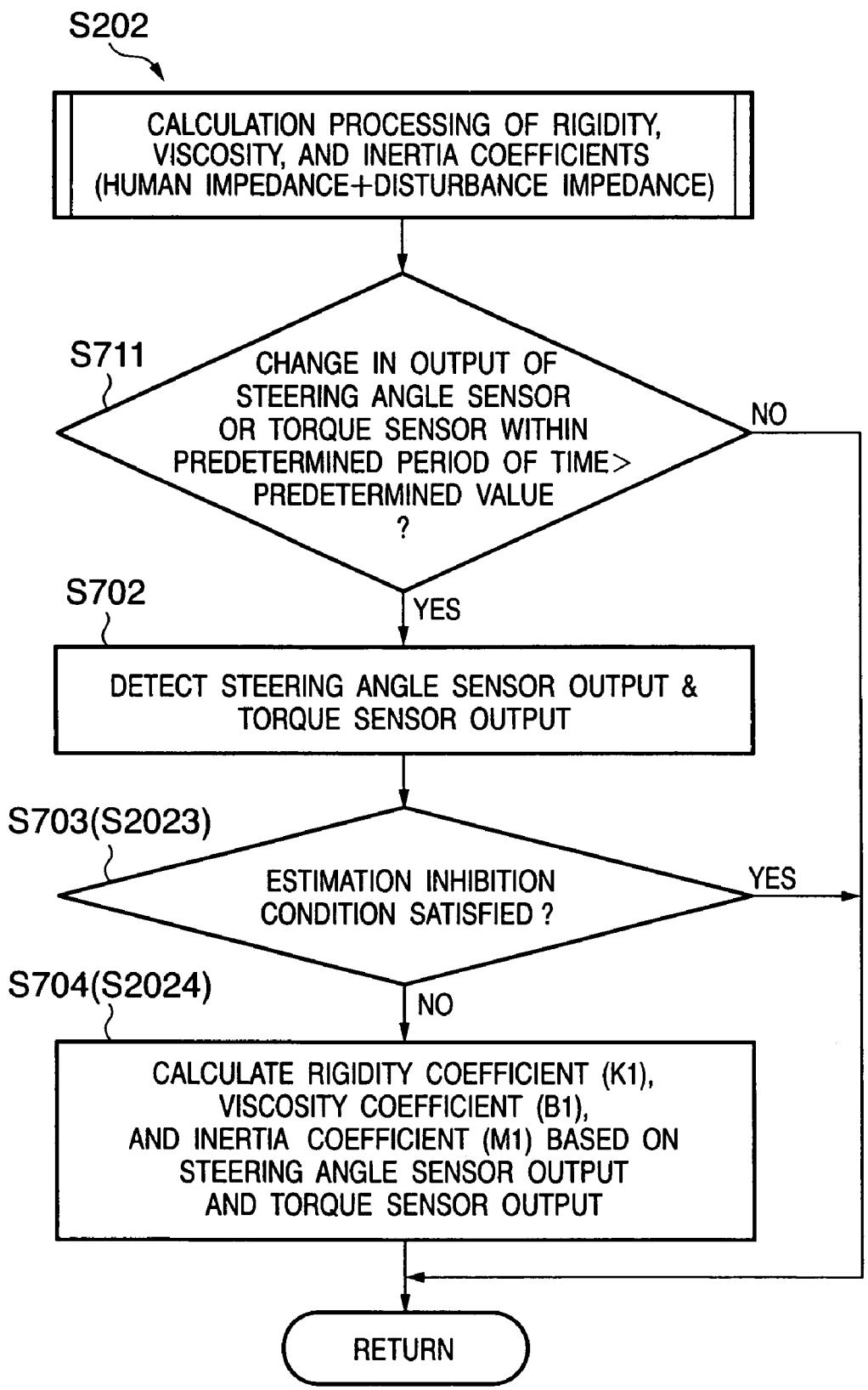
FIG. 21 is a flowchart showing a practical example of the processing for calculating human impedance including disturbance impedance according to the eighth embodiment.

FIG. 21 is a flowchart showing a practical example of the processing for calculating human impedance including disturbance impedance (step S202 in FIG. 8) in this embodiment. The difference from FIG. 20 is that checking processing in step S711 is executed in place of step S701. Since the subsequent processing steps are the same as those in FIG. 20, they are denoted by the same step numbers, and a description thereof will be omitted.

The CPU 111 checks in step S711 if the output from the steering torque sensor 71 has changed to be larger than a predetermined value within a predetermined period of time or if the output from the steering angle sensor 3 has changed to be larger than a predetermined value within a predetermined period of time. If this checking condition is satisfied, the CPU 111 executes step S702 and subsequent steps.

Figure 22A:
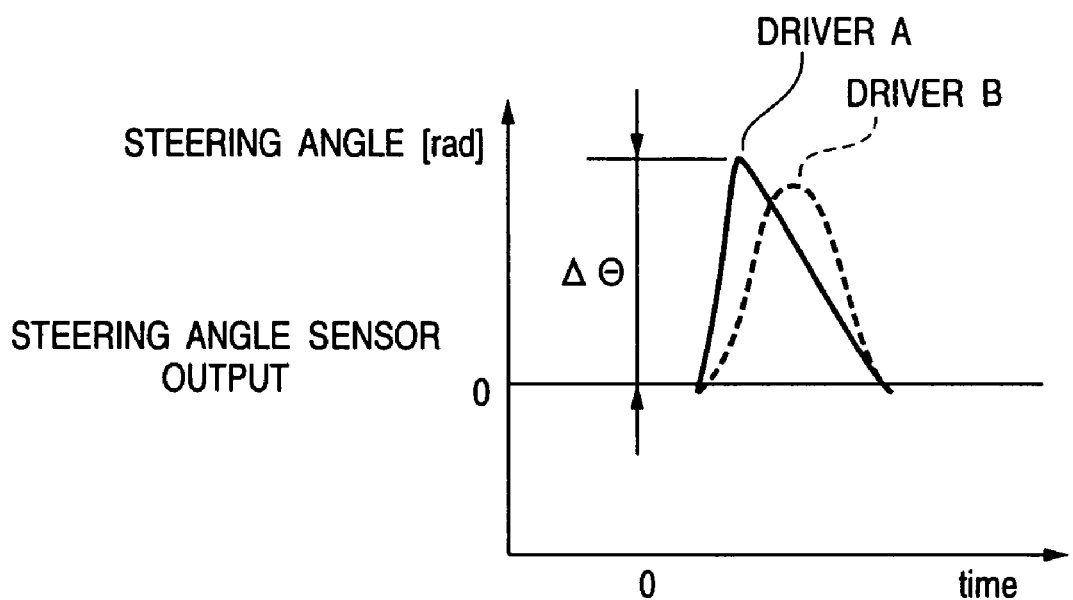
FIGS. 22A and 22B are views for different steering behaviors depending on drivers.
Figure 22B:
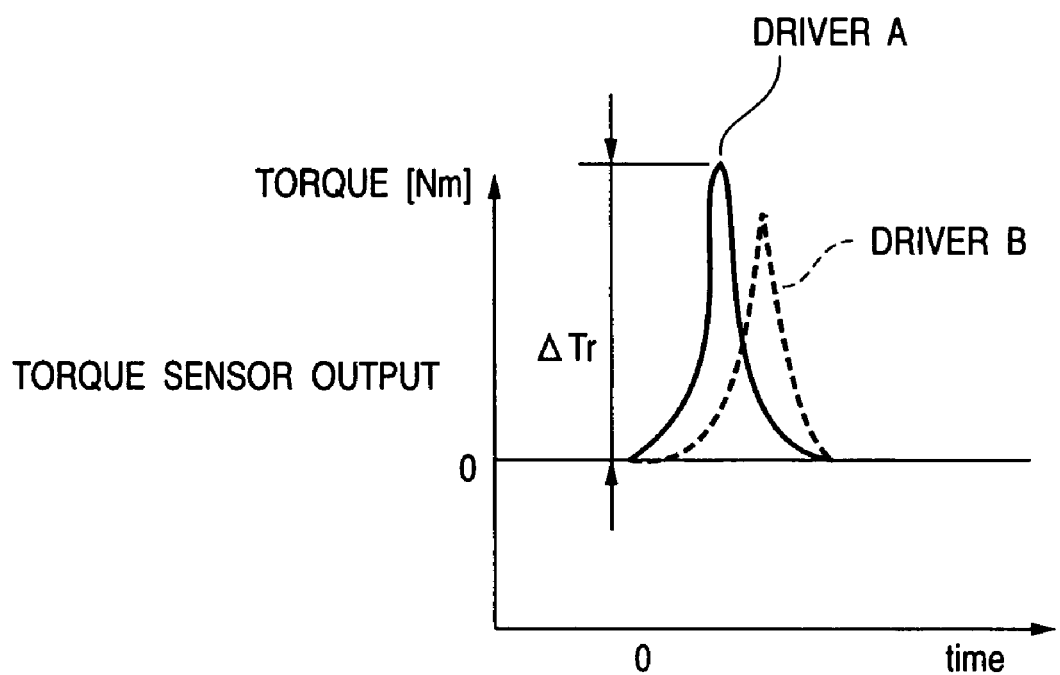

The checking contents in this step S711 are based on the fact that even when different drivers steer a steering wheel with the same steering force characteristics, they have different steering actions (i.e., steering behaviors) depending on different human impedance characteristics of these drivers (see drivers A and B in FIGS. 22A and 22B).

According to the eighth embodiment, the influence of a disturbance can be eliminated with respect to the amount of steering manipulation (i.e., the S/N improves). Therefore, the human impedance can be estimated with high precision.

Ninth Embodiment

Figure 24A:
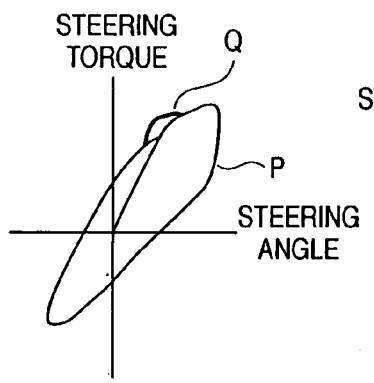
FIGS. 24A to 24F are graphs for explaining the processing for calculating human impedance including a disturbance impedance according to the ninth embodiment.

The ninth embodiment generates a measurement signal described in the second embodiment by superposing measurement signal characteristics on original steering characteristics P at a predetermined angle, as shown in FIG. 24A.

Figure 23:
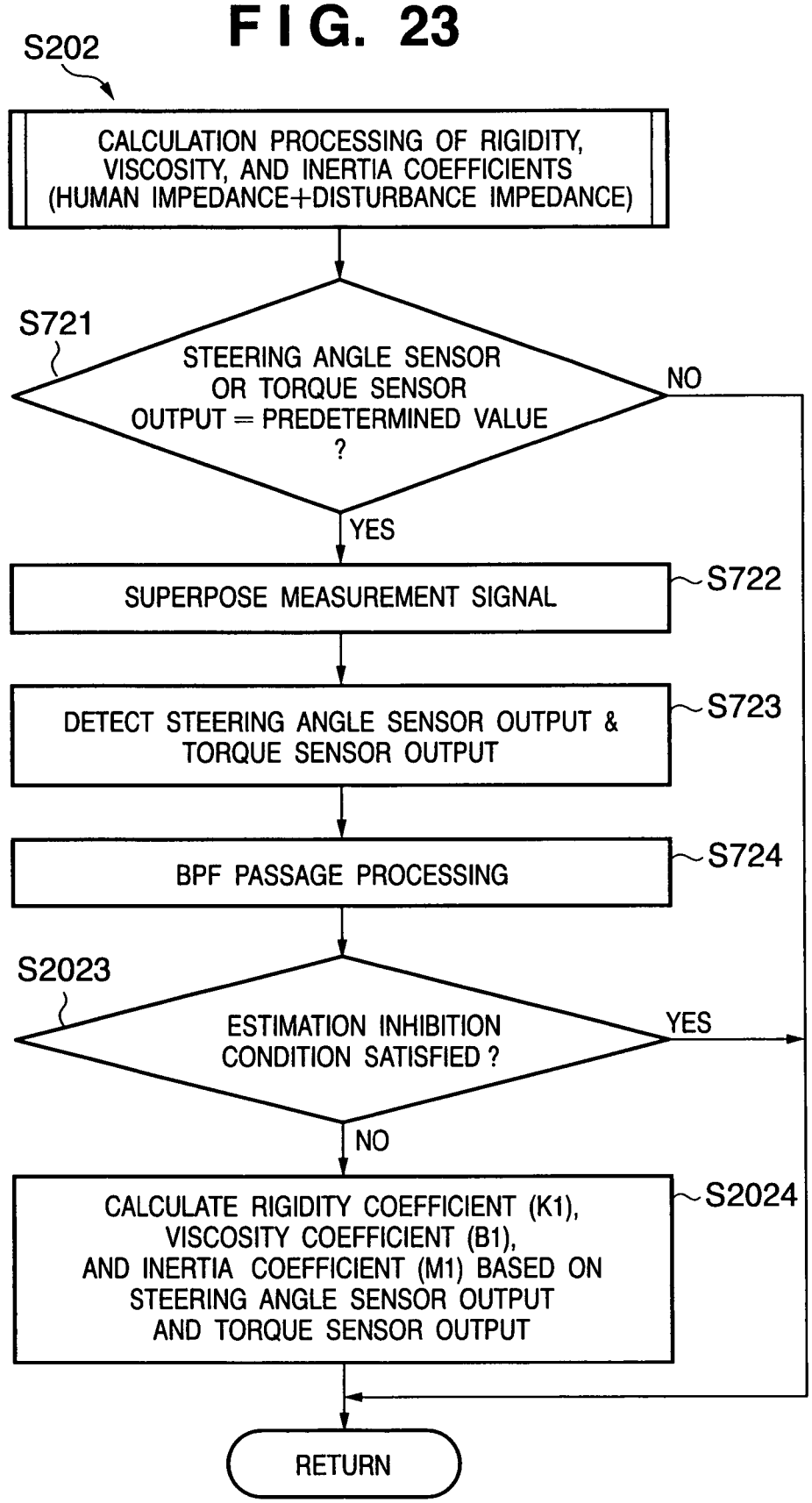
FIG. 23 is a flowchart showing a practical example of the processing for calculating human impedance including a disturbance impedance according to the ninth embodiment.

FIG. 23 is a flowchart showing a practical example of the processing for calculating human impedance including disturbance impedance (step S202 in FIG. 8) in this embodiment, and becomes a substitute of FIG. 9.

The CPU 111 checks in step S721 if the output from the steering angle sensor 3 has a predetermined value or the output from the steering torque sensor has a predetermined value, thereby checking if the steering wheel 2 has a predetermined steering angle or predetermined torque. If this condition is satisfied, the CPU 111 executes the processing in step S722 and subsequent steps.

Figure 24B:
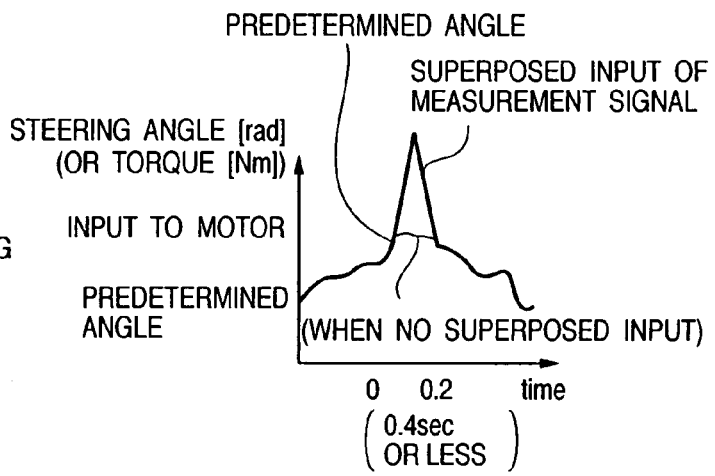

In step S722, the CPU 111 superposes the characteristics of a measurement signal on the original steering characteristics within a predetermined angular range, as described above. This relationship between the time and steering angle is expressed, as shown in FIG. 24B. As shown in FIG. 24B, a projecting part within the predetermined angular range indicates the measurement signal.

Figure 24E:
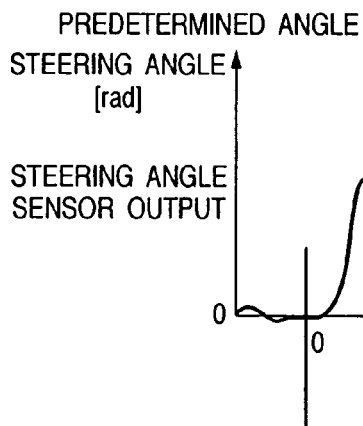
Figure 24C:
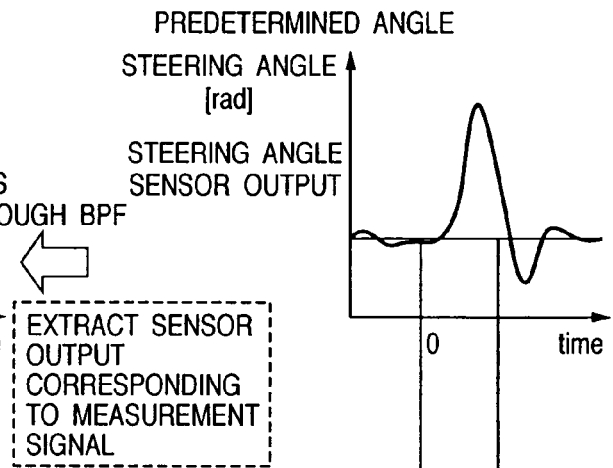
Figure 24F:
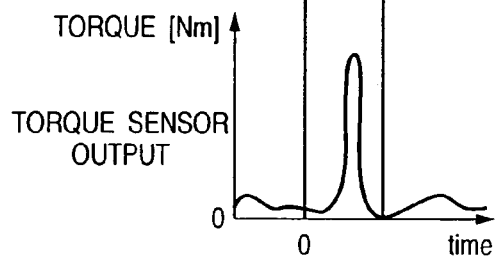
Figure 24D:
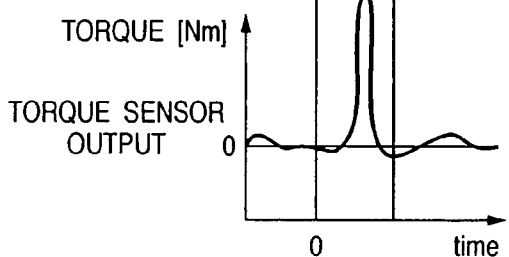

In step S723, the CPU 111 detects the output from the steering angle sensor 3 and the output from the steering torque sensor 71 (see FIGS. 24C and 24D).

In step S724, the CPU 111 inputs the steering angle sensor output waveform and steering torque sensor output waveform obtained in step S723 to a bandpass filter (BPF). In this way, the CPU 111 extracts the steering angle sensor output and steering torque sensor output corresponding to the measurement signal (see FIGS. 24E and 24F).

After that, the CPU 111 executes step S2023 (estimation inhibition checking processing) and step S2024 (coefficient calculation processing) as in FIG. 9.

According to the aforementioned processing, the characteristics of the measurement signal which are superposed in step S722 serve as a trigger which makes the driver perform a steering manipulation. Therefore, the amount of steering manipulation can be reliably measured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-071557 filed Mar. 15, 2006, No. 2006-071558 filed Mar. 15, 2006, No. 2006-071559 filed Mar. 15, 2006, No. 2006-071560filed Mar. 15, 2006 and No. 2006-071563 filed Mar. 15, 2006, which are hereby incorporated by reference herein in their entirety.

What is claimed is:

1. A steering apparatus for a vehicle, comprising:
   a steering wheel;
   a steering rod configured to give a steering angle of tires;
   a steering motor coupled to the steering rod and configured to drive the steering rod to control the steering angle;
   a steering reaction force generation motor coupled to the steering wheel and configured to give a steering feedback to a driver;
   a torque sensor configured to detect a rotational torque on the steering wheel;
   a steering angle sensor configured to detect a steering angle of the steering wheel; and
   a control unit, said control unit comprising;
      a generation unit configured to generate a drive signal as a measurement signal required to drive the steering feedback motor so as to forcibly turn the steering wheel a predetermined amount which does not substantially interfere with the driving of the vehicle; and
      an estimation unit configured to estimate a mechanical impedance of the driver based on outputs from the torque sensor and the steering angle sensor when a steering manipulation is applied in response to the turn of the steering wheel by driving the steering reaction force generation motor according to the measurement signal;
   wherein the control unit is configured to control the steering reaction force generation motor based on the estimated mechanical impedance, thereby giving a proper steering feedback to the driver.

2. The apparatus according to claim 1, wherein the measurement signal is a pulse signal.

3. The apparatus according to claim 2, wherein the amplitude of the pulse signal is gradually increased.

4. The apparatus according to claim 2, further comprising:
   a travel state detection unit configured to detect a travel state of the vehicle; and
   a correction unit configured to correct the pulse signal in accordance with the travel state of the vehicle detected by said travel state detection unit.

5. The apparatus according to claim 2, further comprising:
   a driver's state detection unit configured to detect a driver's state; and
   a correction unit configured to correct the pulse signal in accordance with the driver's state detected by said driver's state detection unit.

6. The apparatus according to claim 1, wherein the measurement signal is a signal corresponding to three-band frequencies which respectively correspond to an inertia term, a viscosity term, and a rigidity term that represent characteristics of the mechanical impedance.

7. The apparatus according to claim 6, wherein said estimation unit applies an estimation method using a spectrum of an output signal from said torque sensor.

8. The apparatus according to claim 1, wherein the measurement signal is a signal which simulates a road surface reaction force.

9. The apparatus according to claim 1, further comprising:
a determination unit configured to determine whether or not the mechanical impedance can be stably estimated; and
an estimation inhibition unit configured to, when said determination unit determines that the mechanical impedance cannot be stably estimated, inhibit said estimation unit from estimating the mechanical impedance.

10. The apparatus according to claim 9, wherein said determination unit determines based on at least one of a tension level of the driver and a road surface μ whether or not the mechanical impedance can be stably estimated.

11. The apparatus according to claim 1, wherein said generation unit generates the measurement signal at one of the timings of an engine start-up timing, of during a steady turn, and of after an elapse of a predetermined period of time of continuous travel.

12. The apparatus according to claim 11, wherein said generation unit does not generate the measurement signal when the driver is not gripping the steering wheel at the engine start-up timing.

13. The apparatus according to claim 1, wherein when the vehicle is a vehicle which uses an electric motor as a drive source in addition to an engine, said generation unit generates the measurement signal at one of timings of a start-up timing of the electric motor, and of during a steady turn and after an elapse of a predetermined period of time of continuous travel.

* * * * *